ical Search Report

United States Patent
Corten et al.

(10) Patent No.: US 10,907,069 B2
(45) Date of Patent: Feb. 2, 2021

(54) MIXING SYSTEM FOR PRODUCING AQUEOUS REPAIR COATING PRODUCTS, METHOD FOR THE PRODUCTION THEREOF, AND AQUEOUS REPAIR COATING PRODUCTS PRODUCED FROM THE MIXING SYSTEM

(71) Applicant: BASF Coatings GMBH, Münster (DE)

(72) Inventors: Cathrin Corten, Muenster (DE); Dirk Eierhoff, Muenster (DE); Britta Schnieders, Muenster (DE); Nicole Freitag, Muenster (DE); Josef Rademacher, Muenster (DE); Michael Grabbe, Muenster (DE)

(73) Assignee: BASF Coatings GmbH, Münster (DE)

( * ) Notice: Subject to any disclaimer, the term of this patent is extended or adjusted under 35 U.S.C. 154(b) by 96 days.

(21) Appl. No.: 16/319,096

(22) PCT Filed: Jul. 20, 2017

(86) PCT No.: PCT/EP2017/068334
§ 371 (c)(1),
(2) Date: Jan. 18, 2019

(87) PCT Pub. No.: WO2018/015484
PCT Pub. Date: Jan. 25, 2018

(65) Prior Publication Data
US 2020/0010721 A1     Jan. 9, 2020

(30) Foreign Application Priority Data

Jul. 20, 2016 (EP) .................... 16180450

(51) Int. Cl.
| | | |
|---|---|---|
| C09D 175/14 | (2006.01) | |
| C09D 7/43 | (2018.01) | |
| C08K 3/013 | (2018.01) | |
| C08F 2/00 | (2006.01) | |
| C08F 2/22 | (2006.01) | |
| C08F 212/08 | (2006.01) | |
| C08F 220/06 | (2006.01) | |
| C08F 220/14 | (2006.01) | |
| C08F 257/02 | (2006.01) | |
| C08G 18/08 | (2006.01) | |
| C08G 18/12 | (2006.01) | |
| C08G 18/28 | (2006.01) | |
| C08G 18/32 | (2006.01) | |
| C08G 18/42 | (2006.01) | |
| C08G 18/48 | (2006.01) | |
| C08G 18/67 | (2006.01) | |
| C08G 18/75 | (2006.01) | |

(Continued)

(52) U.S. Cl.
CPC ............ *C09D 175/14* (2013.01); *C08F 2/001* (2013.01); *C08F 2/22* (2013.01); *C08F 212/08* (2013.01); *C08F 220/06* (2013.01); *C08F 220/14* (2013.01); *C08F 257/02* (2013.01); *C08G 18/0823* (2013.01); *C08G 18/12* (2013.01); *C08G 18/282* (2013.01); *C08G 18/3206* (2013.01); *C08G 18/3271* (2013.01); *C08G 18/4211* (2013.01); *C08G 18/4233* (2013.01); *C08G 18/4854* (2013.01); *C08G 18/679* (2013.01); *C08G 18/755* (2013.01); *C08G 18/758* (2013.01); *C08K 3/013* (2018.01); *C08K 5/05* (2013.01); *C09D 7/43* (2018.01); *C08F 220/1804* (2020.02); *C08F 220/1806* (2020.02)

(58) Field of Classification Search
None
See application file for complete search history.

(56) References Cited

U.S. PATENT DOCUMENTS

| | | | | |
|---|---|---|---|---|
| 2008/0058473 A1* | 3/2008 | Freidzon | ............... | C08L 51/003 525/191 |
| 2009/0068367 A1* | 3/2009 | Geurts | ................ | C09D 133/08 427/385.5 |
| 2015/0064476 A1 | 3/2015 | Kanda | | |

(Continued)

FOREIGN PATENT DOCUMENTS

| | | | |
|---|---|---|---|
| DE | 4437535 | A1 | 4/1996 |
| DE | 19914896 | A1 | 10/2000 |

(Continued)

OTHER PUBLICATIONS

International Search Report for International Application No. PCT/EP2017/068334, dated Aug. 30, 2017, 2 pages.

*Primary Examiner* — Robert T Butcher
(74) *Attorney, Agent, or Firm* — Armstrong Teasdale LLP

(57) ABSTRACT

Provided herein is a mixer system for producing refinish compositions, more particularly for the sector of automotive finishing, including at least mutually different components (1), (2), and (3), namely component (1) as base varnish, component (2) as tinting base, and component (3) as rheology module, with at least one of components (1) to (3) including at least one aqueous dispersion including at least one polymer prepared by multistage emulsion polymerization, and at least one of components (1) to (3) including at least one aliphatic monoalcohol having 5 carbon atoms and/or at least one aliphatic monoalcohol having 6 carbon atoms. Further provided herein is an aqueous refinish composition that is produced by the mixing of components (1) to (3), and a method for producing aqueous refinish compositions. Further provided herein is a use of the mixer system for producing aqueous refinish compositions for automotive refinishing.

14 Claims, No Drawings

(51) Int. Cl.
*C08K 5/05* (2006.01)
*C08F 220/18* (2006.01)

(56) References Cited

U.S. PATENT DOCUMENTS

| | | |
|---|---|---|
| 2018/0265711 A1 | 9/2018 | Corten et al. |
| 2019/0062588 A1 | 2/2019 | Corten et al. |
| 2019/0085116 A1 | 3/2019 | Corten et al. |

FOREIGN PATENT DOCUMENTS

| | | |
|---|---|---|
| DE | 19948004 A1 | 7/2001 |
| DE | 10043405 C1 | 6/2002 |
| EP | 0228003 A1 | 7/1987 |
| EP | 0521928 B1 | 1/1993 |
| EP | 0562329 A1 | 9/1993 |
| EP | 0634431 A1 | 1/1995 |
| WO | 9115528 A1 | 10/1991 |
| WO | 9215405 A1 | 9/1992 |
| WO | 9217554 A1 | 10/1992 |
| WO | 9749745 A1 | 12/1997 |
| WO | 9749747 A1 | 12/1997 |
| WO | 0118129 A1 | 3/2001 |
| WO | 2018011311 A1 | 1/2018 |
| WO | 2018015491 A1 | 1/2018 |
| WO | 2018172475 A1 | 9/2018 |
| WO | 2018172476 A1 | 9/2018 |

* cited by examiner

MIXING SYSTEM FOR PRODUCING AQUEOUS REPAIR COATING PRODUCTS, METHOD FOR THE PRODUCTION THEREOF, AND AQUEOUS REPAIR COATING PRODUCTS PRODUCED FROM THE MIXING SYSTEM

CROSS-REFERENCE TO RELATED APPLICATIONS

This application is the national stage entry of PCT/EP2017/068334, filed on Jul. 20, 2017, which claims the benefit of priority to European Patent Application No. 16180450.5, filed Jul. 20, 2016, which are incorporated by reference in their entirety herein.

FIELD OF THE INVENTION

The present invention relates to a mixer system for producing refinish compositions, more particularly for the sector of automotive finishing, comprising at least the mutually different components (1), (2), and (3), namely component (1) as base varnish, component (2) as tinting base, and component (3) as rheology module, with at least one of components (1) to (3) comprising at least one aqueous dispersion comprising at least one polymer prepared by multistage emulsion polymerization, and at least one of components (1) to (3) comprising at least one aliphatic monoalcohol having 5 carbon atoms and/or at least one aliphatic monoalcohol having 6 carbon atoms. The present invention further relates to an aqueous refinish composition which is produced by the mixing of components (1) to (3), and also to a method for producing aqueous refinish compositions. The present invention relates, furthermore, to the use of the mixer system for producing aqueous refinish compositions for automotive refinishing.

BACKGROUND

Customary methods for repairing damage sites in a possibly multicoat paint system on components of a vehicle body, especially in automotive refinishing, include the steps of careful cleaning and sanding, possibly filling and/or surfacing at the damage site. After this, and possibly after a further pretreatment, the damage site is treated with suitable coating materials such as with suitable basecoat materials, for example, in a coating which is usually covering and which runs out into the bordering regions. After the coating thus produced has undergone initial drying, by being flashed off, the coating and the bordering sections are customarily oversprayed with a clearcoat and then dried together with the coats applied previously.

Whereas the OEM, production-line finishing sector very largely employs aqueous coating materials, there are in some cases still conventional—that is, solventborne—coating materials being used in the automotive refinishing sector. On environmental grounds, however, attempts are being made to replace such coating materials, based on organic solvents, with aqueous coating materials. With these aqueous coating materials, however, in comparison to the corresponding solventborne coating materials, there are often problems which occur with the quality of the resultant coating. During the application of aqueous basecoat materials to a substrate, for example, wetting defects may occur. Other disadvantages are a lack of sufficient hiding power of the coating materials on a substrate. Furthermore, increased clouding is observed, and there is a poorer flop effect with effect coating materials, owing to poorer orientation of the effect pigments. Negative effects of this kind occur especially when attempts are made to reduce the relatively long flash-off and drying times of aqueous coating materials, in order to compensate, specifically from an economic standpoint, this general disadvantage relative to solventborne coating materials.

The requirements nowadays imposed on the refinishing of vehicles are extremely high. In visual and technological terms, therefore, the finished result is to be comparable with a baked original finish, despite substantial differences in the peripheral conditions.

Specifically in the automotive refinishing sector, it is important, when repairing damage sites, that the coating compositions used for the repair have the same or at least approximately the same hues as the coating from the OEM production-line finishing operation, so that after refinishing it is not possible to detect that a repair has taken place at all.

It is indeed possible in principle for the corresponding coating compositions to be supplied directly by the paint manufacturer in the desired hue. A disadvantage of this, however, is that often only small amounts of the paint are needed for the repair, and yet the fully formulated coating compositions in question are often at least not stable on storage for a long period of time such as a period of more than 12 months, for example. For economic reasons, therefore, an approach of this kind has disadvantages.

It has therefore emerged that the individual production of coating compositions is advantageous specifically in the automotive refinishing sector. For this purpose, corresponding mixer systems are provided, comprising different components which are mixed with one another individually according to requirement, in order to produce the corresponding coating composition. This production from a mixer system has the advantage that not every shade must be produced and stocked individually, and that therefore production, distribution, and warehousing costs can be lowered. It is essential in this case that the components of the mixer system have sufficient storage stability (at least 12 months).

Mixer systems in the automotive refinishing sector are known in principle. Thus they usually comprise a pigment-free base varnish component, a number of differently pigmented tinting bases, and a component comprising one or more organic and/or inorganic thickeners for rheology control.

Mixer systems for producing aqueous basecoat compositions are known, for example, from WO 92/17554 A1 and WO 01/18129 A1. These mixer systems allow the production of compositions with precisely specified tinting from different tinting bases.

SUMMARY

A problem addressed by the present invention was therefore that of providing a mixer system which can be used to produce aqueous refinish compositions for automotive refinishing. The aqueous refinish composition produced from the mixer system is to be suitable for achieving a significant reduction in the flash-off times and/or drying times between the individual painting operations. Furthermore, the coating produced from the aqueous refinish composition is to be free from film defects. The coatings, moreover, are to exhibit a good metallic flop in the case of effect finishes, and a cloud-free surface. At the same time, there should be no adverse effect on the other properties of the coating, such as the adhesion to the original finish, for example.

The adhesion problems are especially striking when the coated substrates are exposed to weathering. A further problem addressed by the present invention, therefore, was that of providing an aqueous refinish composition for coatings which, even after having been exposed to weathering, still possess outstanding adhesion properties.

There are further issues which often occur after weathering, particularly blistering and swelling. A further problem addressed by the present invention, then, was additionally to prevent or reduce the incidence of blisters and swelling.

The problems described above are solved by the subject matter claimed in the claims and also by the preferred embodiments of said subject matter which are described in the description below.

A first subject of the present invention is therefore a mixer system for producing aqueous refinish compositions, comprising
- at least one component (1) as pigment-free base varnish, comprising at least one physically curing polyurethane or a self-crosslinking polyurethane or an externally crosslinking polyurethane
- at least one component (2) as tinting base, comprising at least one physically curing polyurethane or a self-crosslinking polyurethane or an externally crosslinking polyurethane and at least one color-imparting and/or optical-effect-imparting pigment
- at least one component (3) as rheology module, comprising at least one inorganic and/or organic thickener,
wherein
at least one of the components, (1), (2) or (3), comprises an aqueous dispersion comprising at least one polymer SCS, and at least one of the components, (1), (2) or (3), comprises at least one aliphatic monoalcohol having 5 carbon atoms and/or at least one aliphatic monoalcohol having 6 carbon atoms, the aqueous dispersion being prepared by the successive radical emulsion polymerization of three mutually different monomer mixtures (A), (B), and (C) of olefinically unsaturated monomers,
where
optionally at least one of the monomer mixtures, (A), (B) or (C), comprises at least one polyurethane (P) containing at least one olefinically unsaturated group, and
where,
before the optional polyurethane (P) is admixed to at least one of the monomer mixtures (A), (B) or (C),
the monomer mixture (A) comprises at least 50 wt % of monomers having a solubility in water of less than 0.5 g/l at 25° C., and a polymer (a) which is prepared from the mixture (A) possesses a glass transition temperature of 10 to 65° C.,
the monomer mixture (B) comprises at least one poly-unsaturated monomer, and a polymer (b) which is prepared from the mixture (B) possesses a glass transition temperature of −35 to 15° C.,
a polymer (c) which is prepared from the monomer mixture (C) possesses a glass transition temperature of −50 to 15° C.,
and where
i. first the monomer mixture (A) is polymerized,
ii. then the monomer mixture (B) is polymerized in the presence of the polymer prepared under i., and
iii. thereafter the monomer mixture (C) is polymerized in the presence of the polymer prepared under ii.

The new mixer system comprising, at least in one of the components (1), (2) or (3), an aqueous dispersion comprising at least one polymer SCS prepared as described above, and, at least in one of the components, (1), (2) or (3), at least one aliphatic monoalcohol having 5 carbon atoms and/or at least one aliphatic monoalcohol having 6 carbon atoms, is also referred to below as mixer system of the invention.

The above-described polymer SCS is what is called a seed-core-shell polymer.

Likewise a subject of the present invention is an aqueous refinish composition produced by mixing components (1), (2), and (3) of the mixer system of the invention, and also a method for producing refinish compositions using a mixer system of the invention. The present invention relates not least to the use of the mixer system of the invention for producing aqueous refinish compositions for automotive refinishing.

DETAILED DESCRIPTION

First of all, a number of terms used in the context of the present invention will be elucidated.

The term "comprising" in the sense of the present invention, in connection with the mixer system of the invention, has, in one preferred embodiment, the definition "consisting of". The term "comprising" in the sense of the present invention, in connection with the aqueous dispersion, has, in one preferred embodiment, the definition "consisting of". The term "comprising" in the sense of the present invention, in connection with the aqueous refinish composition, has, in one preferred embodiment, the definition "consisting of". The term "comprising" in the sense of the present invention, in connection with the components (1), (2), and (3), has, in one preferred embodiment, the definition "consisting of". With regard to the mixer system of the invention and to components (1), (2), and (3), in this preferred embodiment, one or more of the components identified later on below and present optionally in the mixer system and/or in components (1), (2), and (3) may be present therein. The same applies in respect of the aqueous refinish composition of the invention. All components may be present, in each case in their below-stated preferred embodiments, in the mixer system, in components (1), (2), and (3), and also in the aqueous refinish composition.

"Aqueous" in relation to the aqueous refinish compositions and the aqueous dispersions refers to a coating composition or a dispersion, respectively, which comprises a significant fraction of water. In this context, "aqueous" for the purposes of the present invention preferably means that the coating composition or the dispersion has a fraction of at least 40 wt %, preferably at least 50 wt %, very preferably at least 60 wt % of water, based in each case on the total amount of the solvents present (that is, water and organic solvents). More preferably the fraction of water is 40 to 99 wt %, more particularly 50 to 98 wt %, very preferably 60 to 95 wt %, based in each case on the total amount of solvents present.

The term "(meth)acrylate" is intended below to designate both acrylate and methacrylate.

For standards, DIN standards for example, for which no version or year of publication is explicitly stated, the valid version is that which was valid on the filing date or, where there was no valid version in existence on the filing date, the most recent valid version of the standard.

The measurement methods to be employed for the purposes of the present invention to determine particular parameters can be found in the Examples section. Unless explicitly indicated otherwise, these measurement methods are to be used for determining the parameter in question.

The term "binder" in the sense of the present invention, in agreement with DIN EN ISO 4618 (German version, date: March 2007), refers preferably to those nonvolatile fractions excluding pigments and fillers—that are responsible for film formation. The nonvolatile fraction may be determined according to DIN EN ISO 3251 (date: Jun. 1, 2008). More particularly the term "binders" refers to the resins, more particularly polymeric resins, which are present in the coating materials in question and are responsible for film formation. The term "binder" preferably also embraces any crosslinking agents present in the coating material in question.

In the context of the present invention, the concept of the "curing" of a coating composition on a substrate refers to the conversion of the film of coating composition, applied to the substrate, into the service-ready state, in other words into a state in which the substrate furnished with the coating film in question can be transported, stored, and used as intended. A cured coating film, then, is in particular no longer soft or tacky, but is instead conditioned as a solid coating film which, even on further exposure to curing conditions as described later on below, no longer exhibits any substantial change in its properties such as hardness or adhesion to the substrate.

As is known, coating compositions may in principle be cured physically and/or chemically, depending on components present such as binders and crosslinking agents. In the case of chemical curing, consideration is given to thermochemical curing and actinic-chemical curing. Where, for example, a coating composition is thermochemically curable, it may be self-crosslinking and/or externally crosslinking. The indication that a coating composition is self-crosslinking and/or externally crosslinking means, in the context of the present invention, that this coating composition comprises polymers as binders and optionally crosslinking agents that are able to crosslink with one another correspondingly. The underlying mechanisms and also binders and crosslinking agents (film-forming components) that can be used are described later on below. Reference is also made in this context to Römpp Chemie Lexikon, Lacke and Druckfarben, Georg Thieme Verlag, 1998, p. 274.

In the context of the present invention, "physically curable" (also known as physically drying) or the term "physical curing" denotes the formation of a cured coating film by loss of solvent from polymer solutions or polymer dispersions, with the curing being achieved by interlooping of polymer chains. Coating compositions of this kind are generally formulated as one-component coating compositions.

In the context of the present invention, "thermochemically curable" or the term "thermochemical curing" denotes the crosslinking of a coating film (formation of a cured coating film) initiated by chemical reaction of reactive functional groups, where the energetic activation of this chemical reaction by thermal energy is possible, but not absolutely necessary. Different functional groups which are complementary to one another may react with one another here (complementary functional groups), and/or the formation of the cured coat is based on the reaction of autoreactive groups, in other words functional groups which react with groups of their own kind.

This crosslinking may be self-crosslinking and/or external crosslinking. Where, for example, the complementary reactive functional groups are already present in an organic polymer used as binder, as for example in a polyester, a polyurethane or a poly(meth)acrylate, self-crosslinking occurs. External crosslinking occurs, for example, when a (first) organic polymer containing certain functional groups, hydroxyl groups for example, reacts with a crosslinking agent known per se, as for example a polyisocyanate and/or a melamine resin. The crosslinking agent, therefore, contains reactive functional groups which are complementary to the reactive functional groups present in the (first) organic polymer used as binder.

Particularly in the case of external crosslinking, consideration is given to the one-component and multicomponent systems that are known per se, especially two-component systems.

In thermochemically curable one-component systems, the components for crosslinking, such as organic polymers as binders and crosslinking agents, for example, are present alongside one another, in other words in one component. A requirement for this is that the components to be crosslinked react effectively with one another—that is, undergo curing reactions—only at relatively high temperatures, of more than 100° C., for example. It would otherwise be necessary for the components for crosslinking to be stored separately from one another and not mixed with one another until shortly before application to a substrate, in order to avoid premature, at least proportional thermochemical curing (compare two-component systems). An exemplary combination would be hydroxy-functional polyesters and/or polyurethanes with melamine resins and/or blocked polyisocyanates as crosslinking agents.

In thermochemically curable two-component systems, the components to be crosslinked, such as the organic polymers as binders and the crosslinking agents, for example, are present separately from one another in at least two components, which are not combined until shortly before application. This form is selected when the components for crosslinking react effectively with one another even at ambient temperatures or slightly elevated temperatures of, for example, 40 to 90° C. An exemplary combination would be hydroxy-functional polyesters and/or polyurethanes and/or poly(meth)acrylates with free polyisocyanates as crosslinking agents.

It is also possible for an organic polymer as binder to have both self-crosslinking and externally crosslinking functional groups, and to be then combined with crosslinking agents.

In the context of the present invention, "actinic-chemically curable" or the term "actinic-chemical curing" refers to the fact that the curing is possible with application of actinic radiation, namely electromagnetic radiation such as near infrared (NIR) and UV radiation, especially UV radiation, and also particulate radiation such as electron beams for the curing. Curing by UV radiation is initiated customarily by radical or cationic photoinitiators. Typical actinically curable functional groups are carbon-carbon double bonds, in which case, generally, radical photoinitiators are employed. Actinic curing is therefore likewise based on chemical crosslinking.

Of course, in the curing of a coating composition identified as chemically curable, there will always be physical curing as well, in other words the interlooping of polymer chains. The physical curing may even be predominant. Nevertheless, provided it includes at least a proportion of film-forming components which are chemically curable, a coating composition of this kind will be identified as chemically curable.

It follows from the above that according to the nature of the coating composition and the components it comprises, curing is brought about by different mechanisms, which of course also necessitate different conditions at the curing stage, more particularly different curing temperatures and curing times.

In contrast to coating compositions from production-line finishing, refinish compositions cure at substantially lower temperatures. This is necessary because there cannot be any baking of the coating compositions on the substrate objects. Object temperatures of 80° C. must not be exceeded, since otherwise there may be damage, such as the melting of plastic parts, the deforming of tires, and irreversible damage to the electrics.

For this reason, the aqueous refinish compositions produced from the mixer system of the invention are preferably physically and/or actinic-chemically curable, and especially preferably physically curable.

Mixer systems for the production of coating compositions are widespread particularly in the automotive refinishing sector (cf., for example, Brock/Groteklaes/Mischke "Lehrbuch der Lacktechnologie", $2^{nd}$ edition, Vincentz Verlag 2000, p. 332 ff.), since the multiplicity of properties to be set, such as hues, for example, make it difficult to supply and hold in stock corresponding fully formulated coating compositions. The use of a mixer system with different components has therefore become established, instead, these components being able to be mixed individually with one another according to the requirement of the coating composition. According to the entry for the term "Mixer system" in Römpp Lexikon, Lacke and Druckfarben, Georg Thieme Verlag, 1998, p. 393-394, such mixer systems are part of the regular setup specifically in the automotive refinishing sector. The mixer systems customarily comprise different base components. These base components customarily include at least one base varnish, one or more pigmented tinting bases, and at least one rheology module for setting the rheological properties of the coating composition produced from the mixer system. As the skilled person is aware, mixer systems in the automotive refinishing sector are different from conventional formulas of the kind used, for example, for producing basecoat materials for OEM finishing.

The base varnish is customarily a pigment-free composition comprising at least one physically curing and/or one self-crosslinking and/or one externally crosslinking binder. In the case of an externally crosslinking binder, the admixing of a crosslinker, where appropriate, is necessary for the curing of the coating composition.

The tinting bases, in addition to at least one physically curing and/or one self-crosslinking and/or one externally crosslinking binder, customarily comprise at least one color-imparting and/or optical-effect-imparting pigment. By mixing different tinting bases with the base varnish, coating compositions with any of a very wide variety of properties can be produced. These properties include, among others, different hues and/or differently accentuated optical effects, such as the color flop or the metallic flop of a coating, for example.

For setting the rheological properties of the coating composition resulting from the mixer system, it is customary to use a rheology control composition which comprises at least one inorganic and/or organic thickener.

The Mixer System

The mixer system of the invention for producing an aqueous refinish composition comprises at least one component (1) as pigment-free base varnish, comprising at least one physically curing polyurethane or a self-crosslinking polyurethane or an externally crosslinking polyurethane, at least one component (2) as tinting base, comprising at least one physically curing polyurethane or a self-crosslinking polyurethane or an externally crosslinking polyurethane and at least one color-imparting and/or optical-effect-imparting pigment, and at least one component (3) as rheology module, comprising at least one inorganic and/or organic thickener, which are described in more detail below.

It is essential to the invention here that at least one of the components, (1), (2) or (3), comprises an aqueous dispersion comprising at least one polymer SCS, and at least one of the components, (1), (2) or (3), comprises at least one aliphatic monoalcohol having 5 carbon atoms and/or at least one aliphatic monoalcohol having 6 carbon atoms. With preference at least one of the components, (1), (2) or (3), comprises not only the aqueous dispersion comprising at least one polymer SCS but also the at least one aliphatic monoalcohol having carbon atoms and/or the at least one aliphatic monoalcohol having 6 carbon atoms.

It is also possible in principle, however, for two or even all three components (1), (2), and (3) to comprise at least one aqueous dispersion comprising at least one polymer SCS. The same applies to the at least one aliphatic monoalcohol having 5 carbon atoms and/or the at least one aliphatic monoalcohol having 6 carbon atoms.

Component (1)—Base Varnish

The mixer system of the invention comprises at least one component (1) as pigment-free base varnish, comprising at least one physically curing polyurethane or a self-crosslinking polyurethane or an externally crosslinking polyurethane.

Examples of suitable polyurethanes for use in component (1) are set out below. The polyurethane present preferably is ionically and/or nonionically hydrophilically stabilized. In preferred embodiments of the present invention the polyurethane is ionically hydrophilically stabilized. The preferred polyurethanes are linear or contain instances of branching. The polyurethane may also be one in whose presence olefinically unsaturated monomers have been polymerized. This polyurethane may be present alongside the polymer originating from the polymerization of the olefinically unsaturated monomers, without these polymers being bonded covalently to one another. Equally, however, the polyurethane may also be bonded covalently to the polymer originating from the polymerization of the olefinically unsaturated monomers. The olefinically unsaturated monomers are preferably monomers containing acrylate groups and/or methacrylate groups. It is likewise preferred for the monomers containing acrylate and/or methacrylate groups to be used in combination with other olefinically unsaturated compounds which contain no acrylate or methacrylate groups. Olefinically unsaturated monomers attached to the polyurethane are more preferably monomers containing acrylate groups or methacrylate groups, thereby producing polyurethane (meth)acrylates. Very preferably the polyurethane resin is a polyurethane (meth)acrylate. The polyurethane resin present with preference is curable physically and/or with actinic radiation.

Suitable saturated or unsaturated polyurethane resins are described, for example, in German patent application DE 199 14 896 A1, column 1, lines 29 to 49 and column 4, line 23 to column 11, line 5, German patent application DE 199 48 004 A1, page 4, line 19 to page 13, line 48, European patent application EP 0 228 003 A1, page 3, line 24 to page 5, line 40, European patent application EP 0 634 431 A1, page 3, line 38 to page 8, line 9, or international patent application WO 92/15405, page 2, line 35 to page 10, line 32, German patent application DE 4437535 A1, page 7, line 55 to page 8, line 23, international patent application WO 91/15528, page 23, line 29 to page 24, line 24.

The polyurethane of component (1) is prepared using preferably the aliphatic, cycloaliphatic, aliphatic-cycloaliphatic, aromatic, aliphatic-aromatic and/or cycloaliphatic-aromatic polyisocyanates that are known to the skilled person.

As alcohol component for preparing the polyurethanes, preference is given to using the saturated and unsaturated polyols of relatively high molecular mass and of low molecular mass, and also, optionally, monoalcohols, in minor amounts, that are known to the skilled person. Low molecular mass polyols used are more particularly diols and, in minor amounts, triols, for introducing instances of branching. Examples of suitable polyols of relatively high molecular mass are saturated or olefinically unsaturated polyester polyols and/or polyether polyols. Relatively high molecular mass polyols used are more particularly polyester polyols, especially those having a number-average molecular weight of 400 to 5000 g/mol as determined by GPC.

For hydrophilic stabilization and/or for increasing the dispersibility in aqueous medium, the polyurethane resin preferably may contain particular ionic groups and/or groups which can be converted to ionic groups (potentially ionic groups). Polyurethanes of this kind are referred to in the context of the present invention as ionically hydrophilically stabilized polyurethanes. Likewise present may be nonionic hydrophilically modifying groups. Preferred, however, are the ionically hydrophilically stabilized polyurethanes. In more precise terms, the modifying groups are alternatively
  functional groups which can be converted to cations by neutralizing agents and/or quaternizing agents, and/or cationic groups (cationic modification) or
  functional groups which can be converted to anions by neutralizing agents, and/or anionic groups (anionic modification) and/or
  nonionic hydrophilic groups (nonionic modification).

As the skilled person is aware, the functional groups for cationic modification are, for example, primary, secondary and/or tertiary amino groups, secondary sulfide groups and/or tertiary phosphine groups, more particularly tertiary amino groups and secondary sulfide groups (functional groups which can be converted to cationic groups by neutralizing agents and/or quaternizing agents). Mention should also be made of the cationic groups—groups prepared from the aforementioned functional groups using neutralizing agents and/or quaternizing agents known to those skilled in the art—such as primary, secondary, tertiary and/or quaternary ammonium groups, tertiary sulfonium groups and/or quaternary phosphonium groups, more particularly quaternary ammonium groups and tertiary sulfonium groups.

As is well known, the functional groups for anionic modification are, for example, carboxylic acid, sulfonic acid and/or phosphonic acid groups, more particularly carboxylic acid groups (functional groups which can be converted to anionic groups by neutralizing agents), and also anionic groups—groups prepared from the aforementioned functional groups using neutralizing agents known to the skilled person—such as carboxylate, sulfonate and/or phosphonate groups.

The functional groups for nonionic hydrophilic modification are preferably poly(oxyalkylene) groups, more particularly poly(oxyethylene) groups.

The ionically hydrophilic modifications can be introduced into the polyurethane through monomers which contain the (potentially) ionic groups. The nonionic modifications are introduced, for example, through the incorporation of poly(ethylene) oxide polymers as lateral or terminal groups in the polyurethane molecules. The hydrophilic modifications are introduced, for example, via compounds which contain at least one group reactive toward isocyanate groups, preferably at least one hydroxyl group. The ionic modification can be introduced using monomers which, as well as the modifying groups, contain at least one hydroxyl group. To introduce the nonionic modifications, preference is given to using the polyether diols and/or alkoxypoly(oxyalkylene) alcohols known to those skilled in the art.

It is also possible for the polyurethane of component (1) to be a graft polymer. In this case, then, the polyurethane is grafted, for example, with side groups and/or side chains that are based on olefinically unsaturated monomers. These are more particularly side chains based on poly(meth)acrylates. Poly(meth)acrylates for the purposes of the present invention are polymers or polymeric radicals which comprise monomers containing acrylate and/or methacrylate groups, and preferably consist of monomers containing acrylate groups and/or methacrylate groups. Side chains based on poly(meth)acrylates are understood to mean side chains which are constructed during the graft polymerization, using monomers containing (meth)acrylate groups. In the graft polymerization, preference here is given to using more than 50 mol %, more particularly more than 75 mol %, especially 100 mol %, based on the total amount of the monomers used in the graft polymerization, of monomers containing (meth)acrylate groups.

The side chains described are introduced into the polymer preferably after the preparation of a primary polyurethane dispersion. In this case the polyurethane present in the primary dispersion may contain lateral and/or terminal olefinically unsaturated groups via which, then, the graft polymerization with the olefinically unsaturated compounds proceeds. The polyurethane for grafting may therefore be an unsaturated polyurethane (Z). The graft polymerization is in that case a radical polymerization of olefinically unsaturated reactants. Also possible, for example, is for the olefinically unsaturated compounds used for the graft polymerization to contain at least one hydroxyl group. In that case it is also possible first for there to be attachment of the olefinically unsaturated compounds via these hydroxyl groups through reaction with free isocyanate groups of the polyurethane. This attachment takes place instead of or in addition to the radical reaction of the olefinically unsaturated compounds with the lateral and/or terminal olefinically unsaturated groups optionally present in the polyurethane. This is then followed again by the graft polymerization via radical polymerization, as described earlier on above. The result in any case is polyurethanes grafted with olefinically unsaturated compounds, preferably olefinically unsaturated monomers.

As olefinically unsaturated compounds with which the polyurethane (Z) is preferably grafted it is possible to use virtually all radically polymerizable, olefinically unsaturated, and organic monomers which are available to the skilled person for these purposes. A number of preferred monomer classes may be specified by way of example:
  hydroxyalkyl esters of (meth)acrylic acid or of other alpha,beta-ethylenically unsaturated carboxylic acids,
  (meth)acrylic acid alkyl and/or cycloalkyl esters having up to 20 carbon atoms in the alkyl radical,
  ethylenically unsaturated monomers comprising at least one acid group, more particularly exactly one carboxyl group, such as (meth)acrylic acid, for example,
  vinyl esters of monocarboxylic acids which are branched in alpha-position and have 5 to 18 carbon atoms, reaction products of (meth)acrylic acid with the glycidyl ester of a monocarboxylic acid which is branched in alpha-position and has 5 to 18 carbon atoms, further ethylenically unsaturated monomers such as olefins (ethylene for example), (meth)acrylamides, vinylaromatic hydrocarbons (styrene for example), vinyl compounds such as vinyl chloride and/or vinyl ethers such as ethyl vinyl ether.

Used with preference are monomers containing (meth)acrylate groups, and so the side chains attached by grafting are poly(meth)acrylate-based side chains.

The lateral and/or terminal olefinically unsaturated groups in the polyurethane, via which the graft polymerization with the olefinically unsaturated compounds can proceed, are introduced into the polyurethane preferably via particular monomers. These particular monomers, in addition to an olefinically unsaturated group, also include, for example, at least one group that is reactive toward isocyanate groups. Preferred are hydroxyl groups and also primary and secondary amino groups. Especially preferred are hydroxyl groups.

The monomers described through which the lateral and/or terminal olefinically unsaturated groups may be introduced into the polyurethane resin may also, of course, be employed without the polyurethane being additionally grafted thereafter with olefinically unsaturated compounds.

The polyurethane resin is prepared by the customary methods of polymer chemistry. This means, for example, the polyaddition of polyisocyanates and polyols to form polyurethanes, and optionally the graft polymerization that then follows with olefinically unsaturated compounds. These methods are known to the skilled person and can be adapted individually. Exemplary preparation processes and reaction conditions can be found in European patent EP 0521 928 B1, page 2, line 57 to page 8, line 16.

The polyurethane preferably present preferably possesses a number-average molecular weight of 200 to 30 000 g/mol, more preferably of 2000 to 20 000 g/mol, determined by means of GPC. It further possesses, for example, a hydroxyl number of 0 to 250 mg KOH/g, but more particularly from 20 to 150 mg KOH/g. The acid number of the polyurethane resin is preferably 5 to 200 mg KOH/g, more particularly 10 to 40 mg KOH/g.

Component (2)—The Tinting Base

The mixer system of the invention comprises at least one component (2) as tinting base, comprising at least one physically curing polyurethane or one self-crosslinking polyurethane or one externally crosslinking polyurethane. Component (2) further comprises at least one color-imparting and/or optical-effect-imparting pigment.

In relation to the at least one physically curing polyurethane or self-crosslinking polyurethane or externally crosslinking polyurethane, the statements made with regard to component (1) are valid.

The term "pigment" is known to the skilled person, from DIN 55945 (date: October 2001), for example. A "pigment" in the sense of the present invention refers preferably to compounds in powder or platelet form which are insoluble substantially, preferably completely, in the medium surrounding them, such as in component (2), for example. These substances are preferably colorants and/or substances which can be used as a pigment on account of their magnetic, electrical and/or electromagnetic properties. Pigments differ from "fillers" preferably in their refractive index, which for pigments is 1.7.

The pigment is preferably selected from the group consisting of inorganic and organic coloring pigments, effect pigments, and mixtures thereof.

Examples of suitable inorganic coloring pigments are white pigments such as titanium dioxide, zinc white, zinc sulfide or lithopone; black pigments such as carbon black, iron manganese black or spinel black;

chromatic pigments such as chromium oxide, chromium oxide hydrate green, cobalt green or ultramarine green, cobalt blue, ultramarine blue or manganese blue, ultramarine violet or cobalt violet and manganese violet, red iron oxide, cadmium sulfoselenide, molybdate red or ultramarine red; brown iron oxide, mixed brown, spinel phases and corundum phases or chromium orange; or yellow iron oxide, nickel titanium yellow, chromium titanium yellow, cadmium sulfide, cadmium zinc sulfide, chromium yellow or bismuth vanadate. Other inorganic coloring pigments are silicon dioxide, aluminum oxide, aluminum oxide hydrate, more particularly boehmite, zirconium oxide, cerium oxide, and mixtures thereof.

Examples of suitable organic coloring pigments are monoazo pigments, disazo pigments, anthraquinone pigments, benzimidazole pigments, quinacridone pigments, quinophthalone pigments, diketopyrrolopyrrole pigments, dioxazine pigments, indanthrone pigments, isoindoline pigments, isoindolinone pigments, azomethine pigments, thioindigo pigments, metal complex pigments, perinone pigments, perylene pigments, phthalocyanine pigments, or aniline black.

A skilled person is familiar with the concept of effect pigments. Effect pigments more particularly are those pigments which impart optical effect and therefore, for example, bring about the metallic effect in a coating. A corresponding division of the pigments may be made in accordance with DIN 55944 (date: December 2011). The effect pigments are preferably selected from the group consisting of organic and inorganic optical effect pigments, color and optical effect pigments. They are more preferably selected from the group consisting of organic and inorganic, optical effect or color and optical effect pigments. In particular the organic and inorganic optical effect pigments and color and optical effect pigments are selected from the group consisting of optionally coated metallic effect pigments, of optionally coated metal oxide effect pigments, of effect pigments composed of optionally coated metals and nonmetals, and of optionally coated nonmetallic effect pigments. The optionally coated metallic effect pigments, such as silicate-coated pigments, for example, are more particularly aluminum effect pigments, iron effect pigments or copper effect pigments. Especially preferably, optionally coated aluminum effect pigments, such as silicate-coated pigments of this kind, for example, are, in particular, commercially available products from the company Eckart such as Stapa® Hydrolac, Stapa® Hydroxal, Stapa® Hydrolux, and Stapa® Hydrolan, most preferably Stapa® Hydrolux and Stapa® Hydrolan. The effect pigments used inventively, especially optionally coated pigments such as silicate-coated aluminum effect pigments, for example, can be present in any customary form known to the skilled person, such as a leaflet form and/or a platelet form, for example, more particularly a (corn)flake form or a silver dollar form. The effect pigments composed of metals and nonmetals are, in particular, platelet-shaped aluminum pigments coated with iron oxide, as described for example in European patent application EP 0 562 329 A2; glass leaflets coated with metals, especially with aluminum; or interference pigments which comprise a reflector layer made of metal, more particularly aluminum, and which have a strong color flop. The nonmetallic effect pigments are, in particular, pearlescent pigments, in particular mica pigments; platelet-shaped graphite pigments coated with metal oxides; interference pigments which have no metal reflector layer but exhibit a strong color flop; platelet-shaped effect pigments based on iron oxide, with a hue from pink to brownish red; or organic, liquid-crystalline effect pigments. For further details of the effect pigments used inventively, reference is made to Römpp Lexikon Lacke and Druckfarben, Georg Thieme Verlag, 1998, page 176, "Effect pigments" and pages 380 and 381, "Metal oxide-mica pigments" to "Metal pigments".

It is preferred for the mixer system of the invention to comprise more than one mutually different component (2) as tinting bases.

Component (3)—The Rheology Module

The mixer system of the invention comprises at least one component (3) as so-called rheology module, which comprises at least one inorganic and/or organic thickener.

The concept of a thickener is familiar to the skilled person. According to the definition in Römpp Lexikon, Lacke and Druckfarben, Georg Thieme Verlag, 1998, page 599, thickeners (or thickening agents) are needed in order to raise the consistency of a coating composition, as a supplement to the selection of the binder, the solvent (mixture) and the pigment/filler fraction. The action of the thickener is based on various effects, such as, for example, swelling, gelling, association of micelles, solvation, development of network structures and/or hydrogen bonds, and the interplay of these effects.

Inorganic thickeners are preferably selected from the class of the amorphous silicas and the phyllosilicates in their pure form or modified. In the context of the present invention, at least one inorganic thickener selected from the group of the phyllosilicates is preferably employed. Especially suitable phyllosilicates are those from the subgroup of the smectites, more particularly with the subgroups montmorillonite, hectorite, and the synthetic Laponite. A typical representative of the inorganic thickeners is a sodium magnesium phyllosilicate available under the trade name Laponite® RD.

The organic thickeners are preferably selected from the group consisting of (meth)acrylic acid-(meth)acrylate copolymer thickeners, for example the commercial product Rheovis® AS 1130 (BASF SE), and of polyurethane thickeners, for example the commercial product Rheovis® PU1250 from BASF SE. (Meth)acrylic acid-(meth)acrylate copolymer thickeners are those which as well as acrylic acid and/or methacrylic acid also contain in copolymerized form one or more acrylic esters (i.e., acrylates) and/or one or more methacrylic esters (i.e., methacrylates). A feature common to the (meth)acrylic acid-(meth)acrylate copolymer thickeners is that in an alkaline medium, in other words at pH levels >7, more particularly >7.5, by formation of a salt of the acrylic acid and/or methacrylic acid, in other words by the formation of carboxylate groups, they exhibit a strong increase in viscosity. If (meth)acrylic esters are used which are formed from (meth)acrylic acid and a $C_1$-$C_6$ alkanol, the products are essentially nonassociative (meth)acrylic acid-(meth)acrylate copolymer thickeners, such as the abovementioned Rheovis® AS 1130, for example. Essentially nonassociative (meth)acrylic acid-(meth)acrylate copolymer thickeners are also referred to in the literature as ASE thickeners ("Alkali Soluble/Swellable Emulsion" or dispersion). Also possible for use as (meth)acrylic acid-(meth)acrylate copolymer thickeners, however, are those known as HASE thickeners ("Hydrophobically Modified Anionic Soluble Emulsions" or dispersion). These are obtained by using as alkanols, instead of or in addition to the $C_1$-$C_6$ alkanols, those having a larger number of carbon atoms, as for example 7 to 30, or 8 to 20 carbon atoms. HASE thickeners have an essentially associative thickening effect. On account of their thickening properties, the (meth)acrylic acid-(meth)acrylate copolymer thickeners which can be used are not suitable as binder resins, and hence do not come under the physically, thermally, or both thermally and actinically curable binders that are identified as binders, and they are therefore explicitly different from the poly(meth)acrylate-based binders which can be employed in component (3). Polyurethane thickeners are the associative thickeners that are identified in the literature as HEUR ("Hydrophobically Modified Ethylene Oxide Urethane Rheology Modifiers"). Chemically these are nonionic, branched or unbranched, block copolymers composed of polyethylene oxide chains (sometimes also polypropylene oxide chains) which are linked to one another via urethane bonds and which carry terminal long-chain alkyl or alkylene groups having 8 to 30 carbon atoms.

Typical alkyl groups are, for example, dodecyl or stearyl groups; a typical alkenyl group is, for example, an oleyl group; a typical aryl group is the phenyl group; and a typical alkylated aryl group is, for example, a nonylphenyl group. On account of their thickening properties and structure, the polyurethane thickeners are not suitable as binder resins curable physically, thermally, or both thermally and physically. They are therefore explicitly different from the polyurethanes which are used as binders in components (1) and (2).

Optional Components

Components (1), (2) and/or (3) may comprise further adjuvants as optional components. In this case it should be ensured that these corresponding adjuvants are used in components (1), (2) and/or (3) in each case in a technically rational way and that their deployment does not cause any contradictions for components (1), (2) and/or (3). For the skilled person this means, for example, that no pigments as optional adjuvant may be added to the pigment-free component (1). The skilled person is also aware that dispersants are added to the tinting bases frequently for enhanced dispersibility of the pigments employed.

Examples of such adjuvants are salts which can be decomposed thermally without residue or substantially without residue, resins as binders that are curable physically, thermally and/or with actinic radiation and are different from the aforementioned polyurethane resins, crosslinking agents, organic solvents, reactive diluents, fillers, molecularly dispersely soluble dyes, nanoparticles, light stabilizers, antioxidants, deaerating agents, emulsifiers, slip additives, polymerization inhibitors, initiators of radical polymerizations, adhesion promoters, flow control agents, film-forming assistants, sag control agents (SCAs), flame retardants, corrosion inhibitors, waxes, siccatives, biocides, and matting agents.

Suitable adjuvants of the aforementioned kind are known, for example, from

German patent application DE 199 48 004 A1, page 14, line 4 to page 17, line 5,

German patent DE 100 43 405 C1, column 5, paragraphs [0031] to [0033].

They are used in the customary and known amounts.

The Aqueous Dispersion

The aqueous dispersion present in the mixer system of the invention comprises at least one polymer SCS. A dispersion preferably comprises precisely one such polymer. The preparation of the polymer comprises the successive radical emulsion polymerization of three mutually different monomer mixtures (A), (B), and (C) of olefinically unsaturated monomers.

The preparation of the multistage polymer SCS is a multistage radical emulsion polymerization in which i. first of all the mixture (A) is polymerized, then ii. the mixture (B) is polymerized in the presence of the polymer prepared under i., and, further, iii. the mixture (C) is polymerized in the presence of the polymer prepared under ii. All three monomer mixtures are therefore polymerized via a separately conducted radical emulsion polymerization for each (that is, a stage or a polymerization stage), with these stages taking place in succession. In terms of time, the stages may take place directly one after another. It is also possible for the reaction solution in question, after the end of one stage, to be stored for a certain time and/or transferred to a different reaction vessel, and only then for the next stage to take place. The preparation of the specific multistage polymer preferably comprises no other polymerization steps besides the polymerization of the monomer mixtures (A), (B), and (C).

The concept of radical emulsion polymerization is known to the skilled person and is also elucidated in more detail again hereinafter.

In a polymerization of this kind, olefinically unsaturated monomers are polymerized in an aqueous medium, using at least one water-soluble initiator and in the presence of at least one emulsifier.

Corresponding water-soluble initiators are likewise known. The at least one water-soluble initiator is preferably selected from the group consisting of potassium, sodium, or ammonium peroxodisulfate, hydrogen peroxide, tert-butyl hydroperoxide, 2,2'-azobis(2-amidoisopropane) dihydrochloride, 2,2'-azobis-(N,N'-dimethyleneisobutyramidine) dihydrochloride, 2,2'-azobis(4-cyanopentanoic acid), and mixtures of the aforementioned initiators, such as hydrogen peroxide and sodium persulfate, for example. Likewise members of the stated preferred group are the redox initiator systems that are known per se.

By redox initiator systems are meant in particular those initiators which comprise at least one peroxide-containing compound in combination with at least one redox coinitiator, examples being reductive sulfur compounds such as, for example, bisulfites, sulfites, thiosulfates, dithionites or tetrathionates of alkali metals and ammonium compounds, sodium hydroxy-methanesulfinate dihydrate and/or thiourea. Accordingly it is possible to use combinations of peroxodisulfates with alkali metal or ammonium hydrogensulfites, examples being ammonium peroxodisulfate and ammonium disulfite. The weight ratio of peroxide-containing compounds to the redox coinitiators is preferably 50:1 to 0.05:1.

In combination with the initiators it is possible additionally to use transition metal catalysts, such as salts of iron, nickel, cobalt, manganese, copper, vanadium, or chromium, for example, such as iron(II) sulfate, cobalt(II) chloride, nickel(II) sulfate, copper(I) chloride, manganese(II) acetate, vanadium(III) acetate, manganese(II) chloride. Based on the total mass of the olefinically unsaturated monomers used in a polymerization, these transition metal salts are employed customarily in amounts of 0.1 to 1000 ppm. Hence it is possible to use combinations of hydrogen peroxide with iron(II) salts, such as, for example, 0.5 to 30 wt % of hydrogen peroxide and 0.1 to 500 ppm of Mohr's salt, in which case the fractional ranges are based in each case on the total weight of the monomers used in the respective polymerization stage.

The initiators are used preferably in an amount of 0.05 to 20 wt %, preferably 0.05 to 10, more preferably from 0.1 to 5 wt %, based on the total weight of the monomers used in the respective polymerization stage.

An emulsion polymerization takes place within a reaction medium that comprises water as continuous medium and comprises the at least one emulsifier in the form of micelles. The polymerization is initiated by decomposition of the water-soluble initiator in the water. The growing polymer chain enters the emulsifier micelles, and the further polymerization then takes place in the micelles. In addition to the monomers, the at least one water-soluble initiator, and the at least one emulsifier, the reaction mixture therefore consists primarily of water. The stated components, namely monomers, water-soluble initiator, emulsifier, and water, preferably account for at least 95 wt % of the reaction mixture. The reaction mixture preferably consists of these components.

The at least one emulsifier is used preferably in an amount of 0.1-10 wt %, more preferably 0.1-5 wt %, very preferably 0.1-3 wt %, based in each case on the total weight of the monomers used in the respective polymerization stage.

Emulsifiers as well are known in principle. Use may be made of nonionic or ionic emulsifiers, including zwitterionic emulsifiers, and also, optionally, mixtures of the aforementioned emulsifiers.

Preferred emulsifiers are possibly optionally ethoxylated and/or propoxylated alkanols having 10 to carbon atoms. They may have different degrees of ethoxylation and/or propoxylation (for example, adducts modified with poly(oxy)ethylene and/or poly(oxy)propylene chains consisting of 5 to 50 molecule units). Also possible for use are sulfated, sulfonated, or phosphated derivatives of the stated products. Such derivatives are generally employed in neutralized form.

Particularly preferred emulsifiers suitable are neutralized dialkylsulfosuccinic esters or alkyldiphenyl oxide disulfonates, available commercially for example as EF-800 from Cytec.

The emulsion polymerizations are carried out usefully at a temperature of 0 to 160° C., preferably of 15 to 95° C., more preferably of 60 to 95° C.

It is preferred here to operate in the absence of oxygen, and preferably under an inert gas atmosphere. The polymerization is generally carried out under atmospheric pressure, although the application of lower pressures or higher pressures is also possible. Particularly if polymerization temperatures are employed which lie above the boiling point under atmospheric pressure of water, of the monomers used and/or of the organic solvents, it is usual to select higher pressures.

The individual polymerization stages in the preparation of the multistage polymer may be carried out, for example, as what are called "starved feed" polymerizations (also known as "starve feed" or "starve fed" polymerizations).

A starved feed polymerization in the sense of the present invention is an emulsion polymerization in which the amount of free olefinically unsaturated monomers in the reaction solution (also called reaction mixture) is minimized throughout the reaction time. This means that the metered addition of the olefinically unsaturated monomers is such that over the entire reaction time a fraction of free monomers in the reaction solution does not exceed 6.0 wt %, preferably 5.0 wt %, more preferably 4.0 wt %, particularly advantageously 3.5 wt %, based in each case on the total amount of the monomers used in the respective polymerization stage. Further preferred within these strictures are concentration ranges for the olefinically unsaturated monomers of 0.01 to 6.0 wt %, preferably 0.02 to 5.0 wt %, more preferably 0.03 to 4.0 wt %, more particularly 0.05 to 3.5 wt %. For example, the highest weight fraction detectable during the reaction may be 0.5 wt %, 1.0 wt %, 1.5 wt %, 2.0 wt %, 2.5 wt %, or 3.0 wt %, while all other values detected then lie below the values indicated here. The total amount (also called total weight) of the monomers used in the respective polymerization stage evidently corresponds for stage i. to the total amount of the monomer mixture (A), for stage ii. to the total amount of the monomer mixture (B), and for stage iii. to the total amount of the monomer mixture (C).

The concentration of the monomers in the reaction solution here may be determined by gas chromatography, for example. In that case a sample of the reaction solution is cooled with liquid nitrogen immediately after sampling, and 4-methoxyphenol is added as an inhibitor. In the next step, the sample is dissolved in tetrahydrofuran and then n-pentane is added in order to precipitate the polymer formed at the time of sampling. The liquid phase (supernatant) is then analyzed by gas chromatography, using a polar column and an apolar column for determining the monomers, and a flame ionization detector. Typical parameters for the gas-chromatographic determination are as follows: 25 m silica capillary column with 5% phenyl-, 1% vinyl-methylpolysiloxane phase, or 30 m silica capillary column with 50% phenyl-, 50% methyl-polysiloxane phase, carrier gas hydrogen, split injector 150° C., oven temperature 50 to 180° C., flame ionization detector, detector temperature 275° C., internal standard isobutyl acrylate. The measurement is usually carried out only with an aforementioned variant. The selection thereof ought not to have an effect on the result of measurement. In just a few cases, however, there may be a superimposition of signals, removing the possibility of quantitative evaluation. In that case, the measurement is repeated with the variant which has so far not been used. The concentration of the monomers is determined, for the purposes of the present invention, preferably by gas chromatography, more particularly in compliance with the parameters specified above.

The fraction of the free monomers can be controlled in various ways.

One possibility for keeping the fraction of the free monomers low is to select a very low metering rate for the mixture of the olefinically unsaturated monomers into the actual reaction solution, wherein the monomers make contact with the initiator. If the metering rate is so low that all of the monomers are able to react virtually immediately when they are in the reaction solution, it is possible to ensure that the fraction of the free monomers is minimized.

In addition to the metering rate it is important that there are always sufficient radicals present in the reaction solution to allow each of the added monomers to react extremely quickly. In this way, further chain growth of the polymer is guaranteed and the fraction of free monomer is kept low.

For this purpose, the reaction conditions are preferably selected such that the initiator feed is commenced even before the start of the metering of the olefinically unsaturated monomers. The metering is preferably commenced at least 5 minutes beforehand, more preferably at least 10 minutes before. With preference at least 10 wt % of the initiator, more preferably at least 20 wt %, very preferably at least 30 wt % of the initiator, based in each case on the total amount of initiator, is added before the metering of the olefinically unsaturated monomers is commenced.

Preference is given to selecting a temperature which allows constant decomposition of the initiator.

The amount of initiator is likewise an important factor for the sufficient presence of radicals in the reaction solution. The amount of initiator should be selected such that at any given time there are sufficient radicals available, allowing the added monomers to react. If the amount of initiator is increased, it is also possible to react greater amounts of monomers at the same time.

A further factor determining the reaction rate is the reactivity of the monomers.

Control over the fraction of the free monomers can therefore be guided by the interplay of initiator quantity, rate of initiator addition, rate of monomer addition, and through the selection of the monomers. Not only a slowing-down of metering but also an increase in the initiator quantity, and also the premature commencement of addition of the initiator, serve the aim of keeping the concentration of free monomers below the limits stated above.

At any point in time during the reaction, the concentration of the free monomers can be determined by gas chromatography, as described above.

Should this analysis find a concentration of free monomers that comes close to the limiting value for the starved feed polymerization, as a result, for example, of small fractions of highly reactive olefinically unsaturated monomers, the parameters referred to above can be utilized in order to control the reaction. In this case, for example, the metering rate of the monomers can be reduced, or the amount of initiator can be increased.

For the purposes of the present invention it is preferable for the polymerization stages ii. and iii. to be carried out under starved feed conditions. This has the advantage that the formation of new particle nuclei within these two polymerization stages is effectively minimized. Instead, the particles existing after stage i. (and therefore also called seed below) can be grown further in stage ii. by the polymerization of the monomer mixture B (therefore also called core below). It is likewise possible for the particles existing after stage ii. (also below called polymer comprising seed and core) to be grown further in stage iii. through the polymerization of the monomer mixture C (therefore also called shell below), resulting ultimately in a polymer comprising particles containing seed, core, and shell.

Stage i. as well can of course be carried out under starved feed conditions.

The mixtures (A), (B), and (C) are mixtures of olefinically unsaturated monomers. For the purposes of this invention, a distinction is made in each case between the monomer mixtures (A), (B), and (C), and the corresponding monomer mixtures comprising optionally at least one polyurethane containing at least one olefinically unsaturated group. The monomer mixtures (A), (B), and (C), and the polymers (a), (b), and (c) prepared from these monomer mixtures, have the characteristics described below before the polyurethane (P) is admixed.

It is preferred that the monomer mixtures (A), (B), and (C)—apart from the optional admixing of the polyurethane (P)—contain no macromonomers. The concept of the macromonomer is known to the skilled person. It refers to polymers or oligomers which have a reactive functional group and function as a monomer. As a result of this, the macromonomer is a conduit for the introduction of a polymeric or oligomeric side chain into the target polymer.

Olefinically unsaturated monomers suitable in principle may be mono- or polyolefinically unsaturated.

Described first of all below are monomers which can be used in principle and which are suitable across all mixtures (A), (B), and (C), and are monomers that are optionally preferred. Specific preferred embodiments of the individual mixtures will be addressed thereafter. It is preferred for mixtures (A), (B), and (C) each to consist of the monomers described correspondingly hereinafter.

Examples of suitable monoolefinically unsaturated monomers include, in particular, (meth)acrylate-based monoolefinically unsaturated monomers, monoolefinically unsaturated monomers containing allyl groups, and other monoolefinically unsaturated monomers containing vinyl groups, such as vinylaromatic monomers, for example. The term (meth)acrylic or (meth)acrylate for the purposes of the present invention encompasses both methacrylates and acrylates. Preferred for use at any rate, although not necessarily exclusively, are (meth)acrylate-based monoolefinically unsaturated monomers.

(Meth)acrylate-based, monoolefinically unsaturated monomers may be, for example, (meth)acrylic acid and esters, nitriles, or amides of (meth)acrylic acid.

Preference is given to esters of (meth)acrylic acid having a radical R which is not olefinically unsaturated.

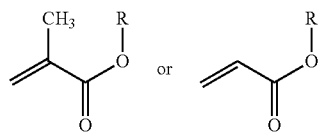

The radical R may be saturated aliphatic, aromatic, or mixed saturated aliphatic-aromatic. Aliphatic radicals for the purposes of the present invention are all organic radicals which are not aromatic. Preferably the radical R is aliphatic.

The saturated aliphatic radical may be a pure hydrocarbon radical or it may include heteroatoms from bridging groups (for example, oxygen from ether groups or ester groups) and/or may be substituted by functional groups containing heteroatoms (alcohol groups, for example). For the purposes of the present invention, therefore, a clear distinction is made between bridging groups containing heteroatoms and functional groups containing heteroatoms (that is, terminal functional groups containing heteroatoms).

Preference is given at any rate, though not necessarily exclusively, to using monomers in which the saturated aliphatic radical R is a pure hydrocarbon radical (alkyl radical), in other words one which does not include any heteroatoms from bridging groups (oxygen from ether groups, for example) and is also not substituted by functional groups (alcohol groups, for example).

If R is an alkyl radical, it may for example be a linear, branched, or cyclic alkyl radical. Such an alkyl radical may of course also have linear and cyclic or branched and cyclic structural components. The alkyl radical preferably has 1 to 20, more preferably 1 to 10, carbon atoms.

Particularly preferred monounsaturated esters of (meth)acrylic acid with an alkyl radical are methyl (meth)acrylate, ethyl (meth)acrylate, propyl (meth)acrylate, isopropyl (meth)acrylate, n-butyl (meth)acrylate, isobutyl (meth)acrylate, tert-butyl (meth)acrylate, amyl (meth)acrylate, hexyl (meth)acrylate, ethylhexyl (meth)acrylate, 3,3,5-trimethylhexyl (meth)acrylate, stearyl (meth)acrylate, lauryl (meth) acrylate, cycloalkyl (meth)acrylates, such as cyclo-pentyl (meth)acrylate, isobornyl (meth)acrylate, and also cyclohexyl (meth)acrylate, with very particular preference being given to n- and tert-butyl (meth)acrylate and to methyl methacrylate.

Examples of other suitable radicals R are saturated aliphatic radicals which comprise functional groups containing heteroatoms (for example, alcohol groups or phosphoric ester groups).

Suitable monounsaturated esters of (meth)acrylic acid with a saturated aliphatic radical substituted by one or more hydroxyl groups are 2-hydroxyethyl (meth)acrylate, 2-hydroxypropyl (meth)acrylate, 3-hydroxypropyl (meth)acrylate, 3-hydroxybutyl (meth)acrylate, and 4-hydroxybutyl (meth)acrylate, with very particular preference being given to 2-hydroxyethyl (meth)acrylate.

Suitable monounsaturated esters of (meth)acrylic acid with phosphoric ester groups are, for example, phosphoric esters of polypropylene glycol monomethacrylate, such as the commercially available Sipomer PAM 200 from Rhodia.

Possible further monoolefinically unsaturated monomers containing a vinyl group are monomers which are different from the above-described acrylate-based monomers and which have a radical R' on the vinyl group that is not olefinically unsaturated.

The radical R' may be saturated aliphatic, aromatic, or mixed saturated aliphatic-aromatic, with preference being given to aromatic and mixed saturated aliphatic-aromatic radicals in which the aliphatic components represent alkyl groups.

Particularly preferred vinylic, olefinically unsaturated monomers are vinylaromatic hydrocarbons, in particular vinyltoluene, alpha-methylstyrene, and especially styrene, or

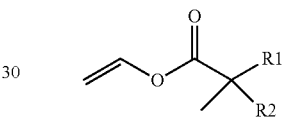

where the radicals R1 and R2 are alkyl radicals with a total of 7 carbon atoms. Latter monomers are available commercially under the name VeoVa 10 from Momentive.

Further monomers suitable in principle are olefinically unsaturated monomers such as acrylonitrile, methacrylonitrile, acrylamide, methacrylamide, N,N-dimethylacrylamide, vinyl acetate, vinyl propionate, vinyl chloride, N-vinylpyrrolidone, N-vinylcaprolactam, N-vinylform-amide, N-vinylimidazole, N-vinyl-2-methylimidazoline, and further unsaturated alpha-beta-carboxylic acids.

Examples of suitable polyolefinically unsaturated monomers include esters of (meth)acrylic acid with an olefinically unsaturated radical R", and allyl ethers of mono- or polyhydric alcohols. The radical R" may be an allyl radical or a (meth)acryloyl radical.

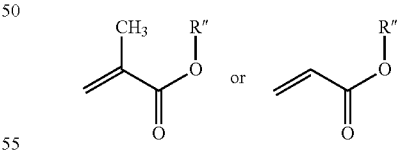

Preferred polyolefinically unsaturated monomers include ethylene glycol di(meth)acrylate, 1,2-propylene glycol di(meth)acrylate, 2,2-propylene glycol di(meth)acrylate, butane-1,4-diol di(meth)acrylate, neopentyl glycol di(meth) acrylate, 3-methylpentanediol di(meth)acrylate, diethylene glycol di(meth)acrylate, triethylene glycol di(meth)acrylate, tetraethylene glycol di(meth)acrylate, dipropylene glycol di(meth)acrylate, tripropylene glycol di(meth)acrylate, hexanediol di(meth)acrylate, and allyl (meth)acrylate.

Furthermore, preferred polyolefinically unsaturated compounds encompass acrylic and methacrylic esters of alcohols having more than two OH groups, such as, for example, trimethylolpropane tri(meth)acrylate or glycerol tri(meth)acrylate, but also trimethylolpropane di(meth)acrylate monoallyl ether, trimethylolpropane (meth)acrylate diallyl ether, pentaerythritol tri(meth)acrylate monoallyl ether, pentaerythritol di(meth)acrylate diallyl ether, pentaerythritol (meth)acrylate triallyl ether, triallylsucrose, and penta-allylsucrose.

Also possible are allyl ethers of mono- or polyhydric alcohols, such as trimethylolpropane monoallyl ether, for example.

Where used, preferred polyolefinically unsaturated monomers are hexanediol diacrylate and/or allyl (meth)acrylate.

With regard to the monomer mixtures (A), (B), and (C) used in the individual polymerization stages, there are specific conditions to be observed, which are set out below.

First of all it should be stated that the mixtures (A), (B), and (C) are at any rate different from one another. They therefore each contain different monomers and/or different proportions of at least one defined monomer.

Mixture (A) comprises at least 50 wt %, preferably at least 55 wt %, of olefinically unsaturated monomers having a water solubility of less than 0.5 g/l at 25° C. One such preferred monomer is styrene.

The solubility of the monomers in water can be determined via establishment of equilibrium of the gas space above the aqueous phase (in analogy to the reference X.-S. Chai, Q. X. Hou, F. J. Schork, Journal of Applied Polymer Science Vol. 99, 1296-1301 (2006)).

For this purpose, in a 20 ml gas space sample tube, to a defined volume of water, preferably 2 ml, a mass of the respective monomer is added which is of a magnitude such that this mass can at any rate not be dissolved completely in the selected volume of water. Additionally an emulsifier is added (10 ppm, based on total mass of the sample mixture). In order to obtain the equilibrium concentration, the mixture is shaken continually. The supernatant gas phase is replaced by inert gas, and so an equilibrium is established again. In the gas phase withdrawn, the fraction of the substance to be detected is measured in each case (preferably by gas chromatography). The equilibrium concentration in water can be determined by plotting the fraction of the monomer in the gas phase. The slope of the curve changes from a virtually constant value (S1) to a significantly negative slope (S2) as soon as the excess monomer fraction has been removed from the mixture. The equilibrium concentration here is reached at the point of intersection of the straight line with the slope S1 and of the straight line with the slope S2. The determination described is carried out at 25° C.

The monomer mixture (A) preferably contains no hydroxy-functional monomers. Likewise preferably, the monomer mixture (A) contains no acid-functional monomers.

Very preferably the monomer mixture (A) contains no monomers at all that have functional groups containing heteroatoms. This means that heteroatoms, if present, are present only in the form of bridging groups. This is the case, for example, in the monoolefinically unsaturated monomers described above that are (meth)acrylate-based and possess an alkyl radical as radical R.

In one particularly preferred embodiment, the monomer mixture (A) comprises at least one monounsaturated ester of (meth)acrylic acid with an alkyl radical and at least one monoolefinically unsaturated monomer containing vinyl groups, with a radical arranged on the vinyl group that is aromatic or that is mixed saturated aliphatic-aromatic, in which case the aliphatic fractions of the radical are alkyl groups.

The monomers present in the mixture (A) are selected such that a polymer (a) prepared from them possesses a glass transition temperature of 10 to 65° C., preferably of 30 to 50° C.

For a useful estimation of the glass transition temperature to be expected in the measurement, the known Fox equation can be employed (cf. T. G. Fox, Bull. Am. Phys. Soc. 1 (1956) 123). Since the Fox equation represents a good approximation, based on the glass transition temperatures of the homopolymers and their parts by weight, without incorporation of the molecular weight, it can be employed as a useful aid to the skilled person in the synthesis, allowing a desired glass transition temperature to be set via a few goal-directed experiments.

The polymer prepared in stage i. by the emulsion polymerization of the monomer mixture (A) is also called seed.

The seed possesses preferably a particle size of 20 to 125 nm (measured by means of dynamic light scattering (photon correlation spectroscopy) according to DIN ISO 13321), the particle size for the purposes of the present invention referring to the measured average particle diameter (Z-average mean). The particle size can be measured using, for example, a "Malvern Nano S90" (from Malvern Instruments).

Monomer mixture (B) comprises at least one polyolefinically unsaturated monomer, preferably at least one diolefinically unsaturated monomer. One such preferred monomer is hexanediol diacrylate.

The monomer mixture (B) preferably contains no hydroxy-functional monomers. Likewise preferably, the monomer mixture (B) contains no acid-functional monomers.

Very preferably the monomer mixture (B) contains no monomers at all with functional groups containing heteroatoms. This means that heteroatoms, if present, are present only in the form of bridging groups. This is the case, for example, in the above-described monoolefinically unsaturated monomers which are (meth)acrylate-based and possess an alkyl radical as radical R.

In one particularly preferred embodiment, the monomer mixture (B), as well as the at least one polyolefinically unsaturated monomer, includes at any rate the following further monomers: first of all, at least one monounsaturated ester of (meth)acrylic acid with an alkyl radical, and secondly at least one monoolefinically unsaturated monomer containing vinyl groups and having a radical located on the vinyl group that is aromatic or that is a mixed saturated aliphatic-aromatic radical, in which case the aliphatic fractions of the radical are alkyl groups.

The fraction of polyunsaturated monomers is preferably from 0.05 to 3 mol %, based on the total molar amount of monomers in the monomer mixture (B).

The monomers present in the mixture (B) are selected such that a polymer (b) prepared therefrom possesses a glass transition temperature of −35 to 15° C., preferably of −25 to +7° C.

The polymer prepared in the presence of the seed in stage ii. by the emulsion polymerization of the monomer mixture (B) is also referred to as the core. After stage ii., then, the result is a polymer which comprises seed and core.

The polymer which is obtained after stage ii. preferably possesses a particle size of 80 to 280 nm, preferably 120 to 250 nm.

The monomers present in the mixture (C) are selected such that a polymer prepared therefrom possesses a glass transition temperature of −50 to 15° C., preferably of −20 to +12° C.

The olefinically unsaturated monomers of this mixture (C) are preferably selected such that the resulting polymer, comprising seed, core, and shell, has an acid number of 10 to 25.

Accordingly, the mixture (C) preferably comprises at least one alpha-beta unsaturated carboxylic acid, especially preferably (meth)acrylic acid.

The olefinically unsaturated monomers of the mixture (C) are further preferably selected such that the resulting polymer, comprising seed, core, and shell, has an OH number of 0 to 30, preferably 10 to 25.

All of the aforementioned acid numbers and OH numbers are values calculated on the basis of the monomer mixtures (A), (B), and (C) employed overall, without admixing of optional polyurethane (P).

In one particularly preferred embodiment, the monomer mixture (C) comprises at least one alpha-beta unsaturated carboxylic acid and at least one monounsaturated ester of (meth)acrylic acid having an alkyl radical substituted by a hydroxyl group.

In one especially preferred embodiment, the monomer mixture (C) comprises at least one alpha-beta unsaturated carboxylic acid, at least one monounsaturated ester of (meth) acrylic acid having an alkyl radical substituted by a hydroxyl group, and at least one monounsaturated ester of (meth) acrylic acid having an alkyl radical.

Where reference is made, in the context of the present invention, to an alkyl radical, without further particularization, what is always meant by this is a pure alkyl radical without functional groups and heteroatoms.

The polymer prepared in the presence of seed and core in stage iii. by the emulsion polymerization of the monomer mixture (C) is also referred to as the shell. The result after stage iii., then, is a polymer SCS which comprises seed, core, and shell.

Polyurethane (P)

In one preferred embodiment of the invention, at least one of the monomer mixtures, (A), (B) or (C), comprises at least one polyurethane (P) containing at least one olefinically unsaturated group.

The polyurethane (P) preferably has a surface tension in the range from 40 mN/m to 55 mN/m at 23° C. and possesses a polydispersity d of less than 10. The surface tension is determined preferably by means of the ring method as in DIN EN 14210:2004-03, with the surface tension measurements being corrected as in DIN EN 14370:2014-11. The surface tension measurement takes place at a temperature of 23° C. It is further preferred for the polyurethane (P) to possess a surface tension in the range from 40.5 mN/m to 50 mN/m at 23° C.

The concept of the surface tension is familiar to the skilled person and denotes a property existing between the surface (interface) between a liquid and a gas, such as the air, for instance.

It is further preferred for the at least one polyurethane (P) containing at least one olefinically unsaturated group to have a polydispersity d of less than 10. It is further preferred for the polyurethane (P) to have a polydispersity in the range from 2 to 7, more preferably in the range from 3 to 6.

The concept of polydispersity is familiar to the skilled person. This term describes the breadth of a molecular weight distribution and is calculated by the ratio of the weight-average molecular weight $M_w$ to the number-average molecular weight $M_n$. Determining the weight-average and number-average molecular weights is done by gel permeation chromatography (GPC) in accordance with DIN55672-1 (March 2016).

The polyurethane (P) preferably used has at least one olefinically unsaturated group. The at least one olefinically unsaturated group ensures that the polyurethane (P), when admixed accordingly to at least one of the monomer mixtures (A), (B) or (C) in the emulsion polymerization, is copolymerized into the seed or the core or the shell, respectively.

The polyurethane (P) is preferably free from NCO groups. In the sense of this invention this means that the amount of NCO groups is less than 0.01 wt %.

The polyurethane (P) preferably has precisely one olefinically unsaturated group. It is possible, though, for minor secondary reactions to occur in the reaction regime for the synthesis of the polyurethane (P), and to result in the polyurethane (P) having more than one olefinically unsaturated group. It is therefore preferred to use polyurethanes (P) which to an extent of at least 90 wt %, preferably at least 95 wt %, very preferably at least 98 wt % have precisely one olefinically unsaturated group.

The polyurethane (P) containing at least one olefinically unsaturated group is prepared preferably by reaction of at least one polyester diol and at least one polyisocyanate, followed by a chain extension reaction with at least one compound containing at least one olefinically unsaturated group and having at least one functional group that is reactive toward isocyanate groups.

The at least one polyester diol preferably used is prepared preferably by an esterification reaction of at least one polycarboxylic acid and/or esters or anhydrides thereof with at least one polyol. The preparation of the polyester diol has no peculiarities. The esterification takes place usually with the aid of a water separator.

For the synthesis of the polyester diol, preference is given to using at least a small molar excess of the polyol over the polycarboxylic acid. In this context it is particularly preferred for the ratio of the carboxylic acid groups of the polycarboxylic acid to the alcohol groups of the polyol to be 1:1.05 to 1:2. More preferably the ratio is 1:1.1 to 1:2.

The polycarboxylic acid is preferably an aliphatically saturated or aromatic carboxylic acid which is in turn preferably a dicarboxylic acid. Examples of suitable aliphatically saturated dicarboxylic acids are ethanedioic acid (oxalic acid), propanedioic acid (malonic acid), butanedioic acid (succinic acid), pentanedioic acid (glutaric acid), hexanedioic acid (adipic acid), heptanedioic acid (pimelic acid), octanedioic acid (suberic acid), nonanedioic acid (azelaic acid), decanedioic acid (sebacic acid), maleic acid, and hexahydrophthalic acid.

Examples of suitable aromatic dicarboxylic acids are 1,2-benzenedicarboxylic acid (phthalic acid), 1,3-benzenedicarboxylic acid (isophthalic acid), and 1,4-benzenedicarboxylic acid (terephthalic acid). The corresponding anhydrides, where they exist, can also be used.

A further possibility is to use dimer fatty acids as polycarboxylic acid. Dimer fatty acids (long also known as dimerized fatty acids or dimer acids) is the term used generally, and especially in the context of the present invention, for mixtures prepared by oligomerization of unsaturated fatty acids. They are for example preparable by catalytic dimerization of unsaturated vegetable fatty acids, with starting materials used being, in particular, unsaturated $C_{12}$ to $C_{22}$ fatty acids. Linkage proceeds principally according to the Diels-Alder type and results, depending on the number and position of the double bonds in the fatty acids used for preparing the dimer fatty acids, in mixtures of primarily dimeric products which, between the carboxyl groups, have cycloaliphatic, linear aliphatic, branched aliphatic, and also $C_6$-aromatic hydrocarbon groups. Depending on mechanism and/or any subsequent hydrogenation, the aliphatic radicals may be saturated or unsaturated and the fraction of aromatic groups as well may vary. The radicals between the carboxylic acid groups in that case contain, for example, 24 to 44 carbon atoms. Fatty acids with 18 carbon atoms are preferred for use in preparation, meaning that the dimeric product has 36 carbon atoms. The radicals which connect the carboxyl groups of the dimer fatty acids preferably have no unsaturated bonds and no aromatic hydrocarbon radicals. In the sense of the present invention, therefore, $C_{18}$ fatty acids are used preferably in the preparation of the dimer fatty acids. Particularly preferred for use are linolenic, linoleic and/or oleic acid.

Depending on the reaction regime, the above-designated oligomerization produces mixtures which primarily comprise dimeric, but also trimeric, molecules and also monomeric molecules and other byproducts. Distillative purification is standard procedure. Commercial dimer fatty acids generally contain at least 80 wt % of dimeric molecules, up to 19 wt % of trimeric molecules, and not more than 1 wt % of monomeric molecules and other byproducts.

Preference is given to using dimer fatty acids which consist to an extent of at least 90 wt %, preferably at least 95 wt %, very preferably at least 98 wt % of dimeric fatty acid molecules.

For the purposes of the present invention it is preferred to use dimer fatty acids which consist to an extent of at least 90 wt % of dimeric molecules, less than 5 wt % of trimeric molecules, and less than 5 wt % of monomeric molecules and other byproducts. Particularly preferred is the use of dimer fatty acids which consist to an extent of 95 to 98 wt % of dimeric molecules, less than 5 wt % of trimeric molecules, and less than 1 wt % of monomeric molecules and other byproducts. Likewise particularly preferred for use are dimer fatty acids which consist to an extent of at least 98 wt % of dimeric molecules, less than 1.5 wt % of trimeric molecules, and less than 0.5 wt % of monomeric molecules and other byproducts. Determining the fractions of monomeric, dimeric, and trimeric molecules and also of other byproducts in the dimer fatty acids may be done for example by gas chromatography (GC). In that case, prior to the GC analysis, the dimer fatty acids are converted via the boron trifluoride method into the corresponding methyl esters (see DIN EN ISO 5509) and then analyzed by GC.

A fundamental characteristic of "dimer fatty acids" for the purposes of the present invention, then, is that their preparation involves the oligomerization of unsaturated fatty acids. This oligomerization results primarily—that is preferably to an extent of at least 80 wt %, more preferably at least 90 wt %, very preferably at least 95 wt %, and more particularly at least 98 wt %—in dimeric products. The fact that the oligomerization predominantly produces dimeric products which therefore contain precisely two fatty acid molecules justifies this nomenclature, which is usual in any case.

Dimer fatty acids for preferred use can be obtained as commercial products. Examples include Radiacid 0970, Radiacid 0971, Radiacid 0972, Radiacid 0975, Radiacid 0976, and Radiacid 0977 from Oleon, Pripol 1006, Pripol 1009, Pripol 1012, and Pripol 1013 from Croda, Empol 1008, Empol 1061, and Empol 1062 from BASF SE, and Unidyme 10 and Unidyme TI from Arizona Chemical.

Different polyols can be employed in the esterification reaction for preparing the preferred polyester diol. Especially preferred in this context is the use of diols, with further preference being given to the use of aliphatic diols having a molecular weight of 62 to 500 g/mol.

The diols may be cycloaliphatic, but preferably acyclic aliphatic, compounds which carry two hydroxyl groups as substituents.

Examples of suitable diols are ethylene glycol, neopentyl glycol, 1,2-propanediol, 2,2-dimethyl-1,3-propanediol, 1,4-butanediol, 1,3-butanediol, 1,5-pentanediol, 2,2,4-trimethyl-1,3-pentanediol, 1,6-hexanediol, 1,4-cyclohexanedimethanol and 1,2-cyclohexanedimethanol.

Further contemplated as polyols are polyethers of the general structural formula

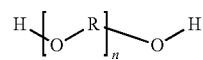

where R is a $C_3$ to $C_6$ alkyl radical. The index n is to be selected in each case such that said polyether possesses a number-average molecular weight of 450 to 2200 g/mol. More preferably it possesses a number-average molecular weight of 700 to 1400 g/mol and very preferably of 800 to 1200 g/mol.

In the polyether for use, all n radicals R may be the same. It is equally possible, however, for there to be different kinds of radicals R present. Preferably all of the radicals R are the same.

R is preferably a $C_3$ or a $C_4$ alkylene radical. More preferably it is an isopropylene or a tetramethylene radical.

Very preferably the polyether for use in accordance with the invention is polypropylene glycol or polytetrahydrofuran.

For further reaction of the polyester diol obtained by esterification reaction, all of the customary and known polyisocyanates used in the coatings field are contemplated in principle.

Examples of suitable polyisocyanates are isophorone diisocyanate (=5-isocyanato-1-isocyanatomethyl-1,3,3-trimethylcyclohexane), 5-isocyanato-1-(2-isocyanatoeth-1-yl)-1,3,3-trimethylcyclohexane, 5-isocyanato-1-(3-isocyanatoprop-1-yl)-1,3,3-trimethylcyclohexane, 5-isocyanato(4-isocyanatobut-1-yl)-1,3,3-trimethylcyclohexane, 1-isocyanato-2-(3-isocyanatoprop-1-yl)cyclohexane, 1-isocyanato-2-(3-isocyanatoeth-1-yl)cyclohexane, 1-isocyanato-2-(4-isocyanatobut-1-yl)cyclohexane, 1,2-diisocyanatocyclobutane, 1,3-diisocyanatocyclobutane, 1,2-diisocyanatocyclopentane, 1,3-diisocyanatocyclopentane, 1,2-diisocyanatocyclohexane, 1,3-diisocyanatocyclohexane, 1,4-diisocyanatocyclohexane, dicyclohexylmethane 2,4'-diisocyanate, dicyclohexylmethane 4,4'-diisocyanate, trimethylene diisocyanate, tetramethylene diisocyanate, pentamethylene diisocyanate, hexamethylene diisocyanate, ethylethylene diisocyanate, trimethylhexane diisocyanate, heptamethylene diisocyanate, or diisocyanates derived from dimer fatty acids, as sold under the trade name DDI 1410 by Henkel and described in patents WO 97/49745 and WO 97/49747, especially 2-heptyl-3,4-bis(9-isocyanatononyl)-1-pentylcyclohexane, 1,2-, 1,4- or 1,3-bis(isocyanatomethyl)cyclohexane, 1,2-, 1,4- or 1,3-bis(2-isocyanatoeth-1-yl)cyclohexane, 1,3-bis(3-isocyanatoprop-1-yl)cyclohexane or 1,2-, 1,4- or 1,3-bis(4-isocyanatobut-1-yl)cyclohexane, m-tetramethylxylylene diisocyanate (i.e., 1,3-bis(2-iso-cyanatoprop-2-yl)benzene) or tolylene diisocyanate.

Also possible is the use of polyisocyanates containing isocyanurate, biuret, allophanate, iminooxadiazinedione, urethane, urea, carbodiimide and/or uretdione groups.

Preferred for use as polyisocyanates are saturated isocyanates, with particular preference being given to the polyisocyanates selected from the group of isophorone diisocyanate and m-tetramethylxylylene diisocyanate.

It is further preferred for the reaction of polyester diols with polyisocyanates to be carried out in the presence of compounds for introducing further carboxyl groups into the polyurethane (P). For this purpose it is possible for example to use α,α-dimethylolalkanoic acids such as 2,2-dimethylolacetic acid, 2,2-dimethylolpropionic acid (DMPA), 2,2-dimethylolbutyric acid, and 2,2-dimethylolpentanoic acid, with 2,2-dimethylolpropionic acid in particular being preferred.

The at least one polyester diol preferably used is reacted with the at least one polyisocyanate, preferably in the presence of DMPA, to give an intermediate having isocyanate groups. This reaction takes place according to the well-known methods of polyurethane chemistry (cf., e.g., Kunststoff-Handbuch [Plastics Handbook], volume 7: Polyurethanes, edited by Dr. G. Oertel, Carl Hanser Verlag, Munich-Vienna 1983).

The reaction can be carried out solventlessly, but is preferably carried out in solvents which are inert toward isocyanate groups and are miscible with water. There is advantage in using solvents which as well as the properties described above are also good solvents for the polyurethanes prepared and can easily be separated from aqueous mixtures. Especially suitable solvents are acetone and methyl ethyl ketone.

The fractions of the polyester diol, of the polyisocyanate and of the DMPA to be used are preferably selected such that the overall ratio of all hydroxyl groups from the polyester diol and DMPA to the isocyanate groups of the polyisocyanate results in a reaction product which has a residual isocyanate group content in the range from 0.08 to 0.1 wt %.

Following the above reaction, there is preferably a reaction of the resulting intermediate, containing isocyanate groups, with at least one compound which contains at least one olefinically unsaturated group and has at least one functional group that is reactive toward isocyanate groups. The group that is reactive toward isocyanate groups is represented in particular by hydroxyl groups and also by primary and secondary amines, with hydroxyl groups in particular being preferred. Especially preferred is for the compound used to have precisely one olefinically unsaturated group.

Preferred for use as alcohols in the so-called chain extension reaction are (meth)acrylate-based, monoolefinically unsaturated alcohols, monoolefinically unsaturated alcohols having allyl groups, and other monoolefinically unsaturated alcohols containing vinyl groups.

Particularly suitable are monounsaturated esters of (meth) acrylic acid with a saturated aliphatic radical that is substituted by a hydroxyl group, such as, in particular, 2-hydroxyethyl (meth)acrylate, 2-hydroxypropyl (meth)acrylate, 3-hydroxypropyl (meth)acrylate, 3-hydroxybutyl (meth) acrylate and 4-hydroxybutyl (meth)acrylate, with 2-hydroxyethyl (meth)acrylate being especially preferred.

The polyurethane (P) may be admixed in principle to any of the monomer mixtures (A), (B) or (C) in the emulsion polymerization. It is possible here for the polyurethane (P) to be admixed only to one of the monomer mixtures (A), (B) or (C). Where admixing takes place to the monomer mixture (A), the polyurethane is copolymerized into the seed of the polymer SCS. Where the admixing is to the monomer mixture (B), the polyurethane (P) is incorporated into the core of the polymer SCS. In the case of admixing of the polyurethane (P) to the monomer mixture (C), the polymerization is into the shell of the polymer SCS. Also possible, however, is for the polyurethane (P) to be admixed not only to one of the monomer mixtures, but for two of the three monomer mixtures (A), (B), and (C) to contain a polyurethane (P). It is also possible, furthermore, for all three monomer mixtures (A), (B), and (C) to be admixed with a polyurethane (P). In that case the polyurethane (P) is polymerized into the seed and into the core and into the shell of the polymer SCS.

In principle the polyurethane (P) may be added to the mixtures (A), (B) and/or (C) in a very wide weight-percentage fractional range. It is preferred for the fraction of the polyurethane (P) in the respective mixtures (A), (B) or (C) to be in a range from 0.1 to 10.0 wt %, based on the solids content of the respective monomer mixture (A), (B) or (C).

The effect of adding the polyurethane (P) to the monomer mixtures (A), (B) or (C) is that it is copolymerized as a comonomer, and the polyurethane (P) additionally has an emulsifying effect. In order to obtain a sufficient emulsifier effect, however, a distinction is to be made as to whether the polyurethane (P) is admixed to the monomer mixture (A) or to the monomer mixtures (B) and/or (C). Where the polyurethane (P) is added to the monomer mixture (A), relatively large quantities of the polyurethane (P) are needed in order to ensure sufficient micelle formation at the start of the emulsion polymerization. Sufficient micelle formation is necessary in order to be able to control the desired particle size. It is therefore preferred for the fraction of the polyurethane in the monomer mixture (A) to be 0.1 to 10 wt %, preferably 1 to 9 wt %, more preferably 5 to 8 wt %, based on the solids content of the monomer mixture (A).

In the case of the admixing of the polyurethane (P) to the monomer mixtures (B) and/or (C), the quantities of polyurethane (P) required are generally lower for a sufficient emulsifier effect to be achieved. Where the polyurethane (P) is admixed to the monomer mixture (B) and/or (C), therefore, it is preferred for the fraction of the polyurethane (P) to be from 0.1 to 1.0 wt %, preferably 0.15 to 0.8 wt %, more preferably 0.2 to 0.6 wt %, based on the solids content of the respective monomer mixture (B) or (C). It is, however, also possible, especially in relation to the monomer mixtures (B) and (C), for higher fractions of the polyurethane (P) to be admixed to the monomer mixtures.

Since the polyurethane (P) can be admixed to all three monomer mixtures (A), (B), and (C), it is preferred for the fraction of the polyurethane (P) to be from 0.05 to 1.8 wt %, preferably from 0.08 to 1.6 wt %, and more preferably from 0.1 to 1.5 wt %, based on the solids content of the aqueous dispersion.

The Aqueous Dispersion Comprising the Polymer SCS

Following its preparation, the polymer SCS preferably possesses a particle size of 100 to 500 nm, more preferably 125 to 400 nm, very preferably from 130 to 300 nm.

The fractions of the monomer mixtures in the emulsion polymerization are preferably harmonized with one another as follows. The fraction of the mixture (A) is from 0.1 to 10 wt %, the fraction of the mixture (B) is from 60 to 80 wt %, and the fraction of the mixture (C) is from 10 to 30 wt %, based in each case on the sum of the individual amounts of the mixtures (A), (B), and (C).

The aqueous dispersion preferably possesses a pH of 5.0 to 9.0, more preferably 7.0 to 8.5, very preferably 7.5 to 8.5. The pH may be kept constant during the preparation itself, through the use of bases as identified further on below, for example, or else may be set deliberately after the polymer SCS has been prepared.

In especially preferred embodiments it is the case that the aqueous dispersion has a pH of 5.0 to 9.0 and the at least one polymer present therein has a particle size of 100 to 500 nm. Even more preferred range combinations are as follows: pH of 7.0 to 8.5 and a particle size of 125 to 400 nm, more preferably pH of 7.5 to 8.5 and a particle size of 130 to 300 nm.

The stages i. to iii. described are carried out preferably without addition of acids or bases known for the setting of the pH. If in the preparation of the polymer, for example, carboxy-functional monomers are then used, as is preferred in the context of stage iii., the pH of the dispersion may be less than 7 after the end of stage iii. Accordingly, an addition of base is needed in order to adjust the pH to a higher value, such as, for example, a value within the preferred ranges.

It follows from the above that the pH preferably after stage iii. is accordingly adjusted or has to be adjusted, in particular through addition of a base such as an (organic) nitrogen-containing base, such as an amine such as ammonia, trimethylamine, triethylamine, tributylamines, dimethylaniline, triphenylamine, N,N-dimethylethanolamine, methyldiethanolamine, or triethanolamine, and also by addition of sodium hydrogencarbonate or borates, and also mixtures of the aforesaid substances. This, however, does not rule out the possibility of adjusting the pH before, during, or after the emulsion polymerizations or else between the individual emulsion polymerizations. It is likewise possible for there to be no need at all for the pH to be adjusted to a desired value, owing to the choice of the monomers.

The measurement of the pH here is carried out preferably using a pH meter (for example, Mettler-Toledo S20 SevenEasy pH meter) having a combined pH electrode (for example, Mettler-Toledo InLab® Routine).

The dispersion comprising a polymer SCS is aqueous. It is preferred for the percentage sum of the solids content of the dispersion and the fraction of water in the dispersion to be at least 80 wt %, preferably at least 90 wt %. Preferred in turn are ranges from 80 to 99 wt %, especially 90 to 97.5 wt %. In this figure, the solids content, which traditionally only possesses the unit "%", is reported in "wt %". Since the solids content ultimately also represents a percentage weight figure, this form of representation is justified. Where, for example, a dispersion has a solids content of 25% and a water content of 70 wt %, the above-defined percentage sum of the solids content and the fraction of water amounts to 95 wt %, therefore.

The dispersion accordingly consists very largely of water and of the polymer SCS, and environmentally burdensome components, such as organic solvents in particular, are present only in minor proportions or not at all.

Aliphatic Monoalcohol Having 5 or 6 Carbon Atoms

The mixer system of the invention, further to the aqueous dispersion comprising a polymer SCS, comprises, at least in one of the components (1), (2) or (3), at least one aliphatic monoalcohol having 5 carbon atoms and/or at least one aliphatic monoalcohol having 6 carbon atoms. It is further preferred for the mixer system of the invention to comprise precisely one aliphatic monoalcohol having 5 carbon atoms or precisely one aliphatic monoalcohol having 6 carbon atoms.

The weight-percentage fraction of the sum of all aliphatic monoalcohols having 5 carbon atoms and 6 carbon atoms in the respective component (1), (2) or (3) is preferably less than 5 wt %, based on the respective component (1), (2) or (3), and at least one of the components (1), (2) or (3) has a weight-percentage fraction of the sum of all aliphatic monoalcohols having 5 carbon atoms and 6 carbon atoms of at least 1.0 wt %, based on the total weight of the respective component (1), (2) or (3).

The aliphatic monoalcohols for inventive use are preferably aliphatic monoalcohols which apart from the hydroxyl group contain no other heteroatoms. The aliphatic carbon chain of the monoalcohol may be branched or linear or cyclic in construction, with monoalcohols of linear construction being especially preferred.

Examples of suitable aliphatic monoalcohols having 5 carbon atoms are pentan-1-ol (n-pentanol), pentan-2-ol, pentan-3-ol, 2-methylbutan-1-ol, 2-methylbutan-2-ol, 3-methylbutan-1-ol, 3-methylbutan-2-ol, 2,2-dimethylpropan-1-ol, and cyclopentanol. Particularly preferred are pentan-1-ol, pentan-2-ol, and pentan-3-ol, with pentan-1-ol being further particularly preferred.

Examples of suitable aliphatic monoalcohols having 6 carbon atoms are hexan-1-ol (n-hexanol), hexan-2-ol, hexan-3-ol, 2-methylpentan-1-ol, 3-methylpentan-1-ol, 4-methylpentan-1-ol, 2-methylpentan-2-ol, 3-methyl-pentan-2-ol, 3-methylpentan-2-ol, 4-methylpentan-2-ol, 2-methylpentan-3-ol, 3-methylpentan-3-ol, 2,2-dimethylbutan-1-ol, 2,3-dimethylbutan-1-ol, 3,3-dimethylbutan-1-ol, 2,3-dimethylbutan-2-ol, 3,3-dimethylbutan-2-ol, 2-ethylbutan-1-ol and cyclohexanol. Particularly preferred are hexan-1-ol, hexan-2-ol and hexan-3-ol, with hexan-1-ol being particularly preferred.

In principle it is also possible to use mixtures of the aforementioned monoalcohols. Contemplated in that case are both mixtures of the different monoalcohols having carbon atoms and mixtures of the different monoalcohols having 6 carbon atoms, and also mixtures between the monoalcohols having 5 carbon atoms and 6 carbon atoms.

The Aqueous Refinish Composition

A further subject of the present invention is an aqueous refinish composition which is produced by mixing components (1), (2) and (3) of the mixer system of the invention. In this context it should be borne in mind that where an externally crosslinking polyurethane is used in components (1) and/or (2), an additional crosslinker may be necessary for curing. Such a crosslinker may be either directly admixed to components (1) and/or (2) or introduced via a separate component (4) shortly before application. In the former case, the crosslinker should be selected such that the result is a storage-stable component (1) and/or (2). This means that there must not be any crosslinking reaction during or directly after mixing, but instead that the crosslinking requires activation by means, for example, of elevated temperature or the action of radiation. Here it is possible to use blocked isocyanates, for example.

Where the crosslinker is introduced into the refinish composition via a separate component (4), this component (4) is to be admixed to the premixed refinish composition shortly before its application. In this case it is possible to use both crosslinkers which react with the externally crosslinking polyurethane of component (1) and/or (2) without additional exposure to heat and/or radiation, and crosslinkers which require such activation. For the first alternative, an example that may be given at this point is that of nonblocked isocyanates.

The nature of the crosslinker for use is dependent in principle on the reactive groups which are present in the binder of the refinish composition. In particular, the nature of the crosslinker must be tailored to the functional groups of the polyurethane and also to the multistage polymer produced. Examples that may be given of possible crosslinkers at this point are amino resins, especially melamine resins, and also blocked and nonblocked polyisocyanates.

A refinish composition is a color and/or effect coating composition which is used in automotive finishing and is employed for the repair and touching-up of an original finish on an automobile. It is usually applied to the metal or plastics substrate after corresponding pretreatment of that substrate, such as sanding and cleaning, for example. In order to protect the color refinish composition from, in particular, environmental influences, at least one additional clearcoat is applied to it.

The fraction of the at least one aqueous dispersion, based on the total weight of the aqueous pigmented refinish composition, is preferably 5 to 60 wt %, more preferably 10 to 50 wt %, and very preferably 20 to 45 wt %.

The fraction of the polymers SCS originating from the aqueous dispersions, based on the total weight of the aqueous basecoat material, is preferably from 1 to 24 wt %, more preferably 2.5 to 20.0 wt %, and very preferably 3 to 18.0 wt %.

Determining or specifying the fraction of the polymers SCS originating from the aqueous dispersions for use in the aqueous refinish composition may be done via the determination of the solids content (also called nonvolatile fraction or solids fraction) of an aqueous dispersion which is to be used in components (1), (2) or (3).

The solids content of the refinish composition of the invention may vary according to the requirements of the case in hand. The solids content is guided primarily by the viscosity that is required for application, especially spray application, and so may be set by the skilled person on the basis of their common general knowledge, where appropriate with the assistance of a few rangefinding tests.

The solids content of the refinish compositions is preferably 5 to 70 wt %, more preferably 10 to 65 wt %, and especially preferably 15 to 60 wt %.

It is further preferred for the weight-percentage fraction of the total of all aliphatic monoalcohols having 5 carbon atoms and 6 carbon atoms, based on the total weight of the refinish composition, to be from 0.2 to 3.0 wt %, preferably from 0.4 to 2.5 wt %.

The aqueous refinish composition of the invention preferably has a VOC content of less than 250 g/L.

In the case of a possible particularization to aqueous refinish compositions comprising preferred aqueous dispersions in a specific proportional range, the following applies. The aqueous dispersions which do not fall within the preferred group may of course still be present in the aqueous refinish composition. In that case the specific proportional range applies only to the preferred group of aqueous dispersions. It is preferred nonetheless for the total proportion of aqueous dispersions, consisting of dispersions from the preferred group and dispersions which are not part of the preferred group, to be subject likewise to the specific proportional range.

In the case of a restriction to a proportional range of to 50 wt % and to a preferred group of aqueous dispersions, therefore, this proportional range evidently applies initially only to the preferred group of aqueous dispersions. In that case, however, it would be preferable for there to be likewise from 10 to 50 wt % in total present of all originally encompassed aqueous dispersions, consisting of aqueous dispersions from the preferred group and aqueous dispersions which do not form part of the preferred group. If, therefore, 35 wt % of aqueous dispersions of the preferred group are used, not more than 15 wt % of the aqueous dispersions of the non-preferred group may be used.

The stated principle is valid, for the purposes of the present invention, for all stated components of the refinish composition and for their proportional ranges—for example, for the pigments specified later on below, or else for the crosslinking agents specified later on below.

The aqueous refinish composition generally comprises coloring pigments and/or optical-effect pigments, which are introduced into the refinish composition via at least one component (2).

The fraction of the pigments may be, for example, in the range from 1 to 40 wt %, preferably 2 to 20 wt %, more preferably 5 to 15 wt %, based on the total weight of the aqueous refinish composition.

A further subject of the present invention is a method for producing aqueous refinish compositions which comprises using the mixer system of the invention.

A further subject of the present invention is therefore the use of the mixer system of the invention for producing aqueous refinish compositions for automotive refinishing. All preferred embodiments described hereinabove in connection with the mixer system of the invention are also preferred embodiments of the mixer system of the invention in the context of its use for producing aqueous refinish compositions for automotive refinishing.

The invention is elucidated below in the form of examples.

EXAMPLES

Description of Methods

Determination of Acid Number

The acid number was determined in accordance with DIN EN ISO 2114 (date: June 2002), using "method A". The acid number corresponds to the mass of potassium hydroxide in mg which is needed to neutralize 1 g of sample under the conditions specified in DIN EN ISO 2114. The reported acid number corresponds to the total acid number specified in the DIN standard.

Determination of OH Number

The OH number was determined according to DIN 53240-2 (date: November 2007). The OH groups are acetylated by reaction with excess acetic anhydride. The excess acetic anhydride is then split into acetic acid by addition of water, and the total acetic acid is back-titrated with ethanolic KOH. The OH number indicates the amount of KOH in mg which is equivalent to the amount of acetic acid bound in the acetylation of 1 g of sample.

Determination of Number-Average and Weight-Average Molecular Weight

The number-average molecular weight ($M_n$) was determined by gel permeation chromatography (GPC) according to DIN 55672-1 (date: August 2007). Besides the number-average molecular weight, this method can be used to determine the weight-average molecular weight ($M_w$) and also the polydispersity d (ratio of weight-average molecular weight to number-average molecular weight ($M_n$)) as well. Tetrahydrofuran is used as eluent. The determination takes place against polystyrene standards. The column material consists of styrene-divinylbenzene copolymers.

Determination of Surface Tension

The surface tension of the polyurethanes (P) was determined using the ring method of DIN EN 14210:2004-03 at 23° C. The corresponding instrument used was a ring/plate tensiometer from Lauda (Lauda TE1C with Du Nouy ring and Wilhelmy plate). The surface tension values are corrected as in DIN EN 14370:2014-11.

Determination of Solids Content or Nonvolatile Fraction

The solids content of the aqueous dispersion was determined according to DIN EN ISO 3251 (Jun. 1, 2008) at 125° C., 60 min, initial mass 1.0 g (table A.2, Method C of DIN EN ISO 3251). The solids content of the refinish composition and of the individual components of the mixer system was determined according to DIN EN ISO 3251, table A.1 (date: Jun. 1, 2008). In this determination, 1 g of sample is weighed out into an aluminum dish dried beforehand, and is dried in a drying oven at 130° C. for 60 minutes, cooled in a desiccator and then weighed again. The residue, relative to the total amount of the sample introduced, corresponds to the solids content.

Determination of Dry Film Thicknesses

The film thicknesses were determined as in DIN EN ISO 2808 (date: May 2007), method 12A, using the MiniTest® 3100-4100 instrument from ElectroPhysik.

Production of Multicoat Systems

For assessing the properties of the waterborne basecoat materials of the invention and also of comparative compositions, multicoat paint systems were produced in accordance with the following general protocol:

A steel panel coated with a standard cathodic electrocoat (CathoGuard® 580 Black from BASF Coatings) is padded up (i.e., the substrate is partially roughened manually using a 3M™ Scotch-Brite™ abrasive pad) and then cleaned with a cleaning composition (Glasurit® 700-1). First of all, using a spray gun (SATAjet® HVLP 4000, entry pressure: 2 bar, pressure at nozzle: 0.7 bar), a commercial primer-surfacer (Glasurit® 285-270 Grundfuller Pro, Glasurit® 929-58 Fullerharter Pro, and Glasurit® 352-91 Einstellzusatz in a volume ratio of 5:1:1) is applied in 2 spray passes, followed by drying at 60° C. for 30 minutes; the target thickness of the resulting dry film is 60 μm.

After sanding has taken place using an excentric sander (adhesive sanding sheets 150 mm P 400) with subsequent cleaning with a cleaning composition (Glasurit® 700-1), a spray gun (SATAjet® HVLP 4000, entry pressure: 2 bar, pressure at nozzle: 0.7 bar) is used to apply the respective waterborne basecoat material by method A (initially two spray passes, after each of which the resulting film is flashed off for about 10-15 minutes until the surface appears matt, followed by an effect pass known to the skilled person, which ensures a good metallic effect, and also by subsequent further flashing off for 5 minutes) or B (two spray passes without flashing off in-between, i.e., wet-on-wet application, followed by flashing off for about 15-20 minutes until the surface appears matt, without a subsequent effect pass). The resulting overall dry film thickness of the respective coating composition is to be 10 μm.

This is followed by the application in two spray passes of a commercial clearcoat (Glasurit® 923-335 HS-Multi-Klarlack and Glasurit® 929-33 Harter in a volume ratio of 2:1, and also, based on this mixture, a 10% volume fraction of Glasurit® 352-91 Rheologiemodul) with a target dry film thickness of 50-60 μm. The drying is carried out at 60° C. for 30 minutes.

Determination of Moisture Resistance

To determine the resistance of the inventive coating compositions and of the comparative compositions with respect to moisture, substrates coated accordingly were subjected to a constant condensation conditions test under CH test conditions in a conditioning chamber in accordance with DIN EN ISO 6270-2 (date: September 2005) over a period of 10 days. The panels were subsequently inspected for blistering and swelling, 1 hour and 24 hours after removal from the conditioning chamber. If no swelling occurs, the result is recorded as OK (satisfactory). If there is any slight swelling, the result is rated as bOK (basically satisfactory), while more severe swelling is given a rating of nOK (not satisfactory).

The incidence of blisters is assessed as follows by a combination of 2 scores:

the number of blisters is scored by a quantity figure from 0 to 5, with m1 denoting very few and m5 very many blisters.

the size of the blisters is scored by a size figure likewise from 1 to 5, with g1 denoting very small and g5 very large blisters.

The designation mOgO, accordingly, denotes a blister-free coating after condensation storage, and represents an OK result for blistering.

To assess the technological properties of the multicoat systems after condensation exposure, cross-cuts were carried out according to DIN EN ISO 2409 (rating GT 0 to GT 5; 0=best score; 5=worst score).

Determination of Adhesion Properties in Stonechip and Steam Jet Tests

The multicoat paint systems are assessed for stonechip adhesion as in DIN EN ISO 20567-1 (April 2007), method B. The resultant damage pattern is likewise assessed as in DIN EN ISO 20567-1. Furthermore, steam jet tests were carried out as in DIN 55662, method B. The scratches (diagonal cross) were made using a Sikkens scratch needle (see DIN EN ISO 17872 annex A). The assessment of the steam jet test results was made according to DIN 55662, and in particular the maximum width of the detachments in millimeters was ascertained.

Determination of Angle-Dependent Lightnesses/Flop Index

For determining the lightness or the flop index, a substrate coated accordingly (multicoat system as per above-described method A or B) is subjected to measurement using a spectrophotometer (e.g., X-Rite MA60B+BA Multi-Angle Spectrophotometer). The surface here is illuminated with a light source. Spectral detection in the visible range is carried out at different angles. The spectral measurements obtained in this way can be used, taking into account the standardized spectral values and also the reflection spectrum of the light source used, to calculate color values in the CIEL*a*b* color space, where L* characterizes the lightness, a* the red-green value, and b* the yellow-blue value. This method is described in, for example, ASTM E2194-12, especially for coatings whose pigment comprises at least one effect pigment. The derived value, often employed for quantifying the so-called metallic effect, is the flop index, which describes the relationship between the lightness and the angle of observation. From the lightness values determined for the viewing angles of 25° and 75°, it is possible to calculate a flop index (FI) according to the formula $$FI = (L^*_{25°}/L^*_{75°})*100$$

where L* stands for the lightness value measured at the respective angle (25° and 75°).

Determination of Free Isocyanate Group Content

Determining the amount of free isocyanate groups, also referred to below as NCO content, was done by adding an excess of 2% N,N-dibutylamine solution in xylene to a homogeneous solution of the samples in acetone/N-ethylpyrrolidone (1:1 vol %), by potentiometric back-titration of the excess amine with a 0.1N hydrochloric acid as in DIN EN ISO 3251, DIN EN ISO 11909 and DIN EN ISO 14896.

Via the fraction of a polymer (solids content) in solution, it is possible to calculate back to the NCO content of the polymer, based on solids content.

Determination of Glass Transition Temperature Tg of the Polymers

The glass transition temperature Tg is determined for the purposes of the invention experimentally in accordance with DIN 51005 "Thermal Analysis (TA) —Terms" and DIN 53765 (March 1994) "Thermal Analysis —Differential Scanning calorimetry (DSC)". A 15 mg sample is weighed out into a sample boat and inserted into a DSC apparatus. After cooling to the start temperature, measurement is carried out in runs 1 and 2, under inert gas blanketing (N2) of 50 ml/min, at a heating rate of 10 K/min, with cooling back down to the start temperature between each of the runs. Measurement takes place customarily in a temperature range from about 50° C. lower than the expected glass transition temperature up to about 50° C. higher than the glass transition temperature. The glass transition temperature for the purposes of the present invention and in accordance with DIN 53765, section 8.1, is the temperature in the $2^{nd}$ measuring run at which half of the change in the specific heat capacity (0.5 delta cp) has been reached. It is determined from the DSC diagram (plot of the heat flow against the temperature). It represents the temperature which corresponds to the point of intersection of the center line with the measurement plot between the extrapolated baselines before and after the glass transition.

Determination of Particle Size of Polymers

The particle size of the polymers was determined by dynamic light scattering as in DIN ISO 13321 (October 2004).

Determination of VOC Content

The VOC content of the aqueous refinish compositions is determined according to DIN ISO 11890-1 (September 2009).

WORKING EXAMPLES

The inventive and comparative examples hereinafter serve for elucidation of the invention, but should not be given a limiting interpretation.

Unless otherwise indicated, the amounts in parts are parts by weight, and amounts in percent are weight percentages in each case.

1. Components Used

The definition of the components identified below and used for producing the inventive mixer system and corresponding comparative examples is as follows:

| | |
|---|---|
| Dimer fatty acid | polymeric fatty acid (dimer content at least 98 wt %, trimer content not more than 2 wt %, monomer content no more than traces), e.g., Pripol ® 1012 from Croda |
| PTHF | PolyTHF ® 1000, available from BASF SE |
| DMPA | dimethylolpropionic acid |
| NCO | isocyanate |
| IPDI | isophorone diisocyanate |
| DMEA | dimethylethanolamine |
| TMP-Al | trimethylolpropane monoallyl ether, available commercially from Perstorp |
| DI water | deionized water |
| EF 800 | Aerosol ® EF-800, commercially available emulsifier from Cytec |
| APS | ammonium peroxodisulfate |
| 1,6-HDDA | 1,6-hexanediol diacrylate |

-continued

| | |
|---|---|
| 2-HEA | 2-hydroxyethyl acrylate |
| MMA | methyl methacrylate |
| Acrysol RM-8 | nonionic polyurethane thickener from The Dow Chemical Company |
| Acticide B20 | biocide from Thor GmbH |
| Aquacer 840 | cationic emulsion of an oxidized HD (high-density) polyethylene wax from BYK Chemie GmbH |
| Rheovis AS 1130 | acrylate thickener available from BASF SE |
| Aerosil ® R 972 | hydrophobized fumed silica available from Evonik Industries AG |
| Aerodisp ® WR 8520 | silica dispersion available from Evonik Industries AG |
| Raybo 61 AquaWet | surface additive available from Raybo Chemical Company |
| Laponite ® RD | Na Mg phyllosilicate from BYK Chemie GmbH |
| Pluriol ® P900 | polypropylene oxide available from BASF SE |
| Parmetol DF 35 | biocide available from Schülke & Mayr GmbH |

1. Examples of the Preparation of the Aqueous Dispersions Comprising at Least One Polymer SCS 1.1 Synthesis of a Polyurethane (P)

a) Preparation of a Polyester Diol ED1

A polymeric fatty acid (dimer content at least 98 wt %, trimer content not more than 2 wt %, monomer content no more than traces) is placed in a reaction vessel with stirrer, reflux condenser, and water separator, and mixed with a diol component and also with cyclohexane as entrainer. The mixture is heated with stirring at a temperature in the range from 160 to 240° C. until the desired amount of water has been removed, indicating the complete or desired conversion.

TABLE 1.1

Composition/characteristics of polyester diol ED1

| Item | | ED1 |
|---|---|---|
| Dimer fatty acid | 4 | 17.83 |
| PTHF | 5 | 61.56 |
| Cyclohexane as entrainer | 7 | 0.80 |
| Solids content [%] | | 97 |
| OH number [mg KOH/g] | | 50 |
| Acid number [mg KOH/g] | | 2.5 |
| Mn [g/mol] | | 3450 | b) Preparation of the Polyurethane (P1)

The polyester diol ED1, DMPA, and a diisocyanate component are weighed out together with an inert solvent, MEK for example, into a reaction vessel with stirrer and reflux condenser. The mixture is then heated to 80° C. This temperature is maintained until the measured amount of free isocyanate groups is constant.

Subsequently, at 80° C., chain extension is carried out with a hydroxyl compound containing olefinically unsaturated groups (in 20% excess). The addition is made over the course of 30 minutes. This is followed by further stirring at constant temperature until a free isocyanate content of less than 0.01 wt % is obtained; any residual isocyanate groups still present are reacted with butanol.

Subsequently, at 80° C., DMEA is added at a uniform rate over the course of 30 minutes, followed by homogenization for 1 hour, to give a degree of neutralization of 80%. Thereafter the resin is adjusted with deionized water to the corresponding solids content, the water being added at a uniform rate over the course of 90 minutes. After a further hour of homogenization, the solvent is distilled off under reduced pressure at 80° C.

TABLE 1.2

Composition of polyurethane (P1)

|  | (P1) |
|---|---|
| Polyester diol |  |
| ED1 | 20.38 |
| DMPA | 23.49 |
| Diisocyanate |  |
| IPDI | 58.82 |
| Chain extension |  |
| TMP-Al | 17.70 |
| Neutralization |  |
| Degree of neutralization, set with DMEA | 80% |

TABLE 1.3

Characteristics of polyurethane (P1)

| Characteristics | (P1) |
|---|---|
| Solids content [%] | 27.6 |
| Acid number [mg KOH/g] | 22.0 |
| $M_n$ | 7310 |
| $M_w$ | 40 090 |
| Polydispersity d | 5.5 |
| Particle size $D_h$ [nm] | 42 |
| Surface tension [mN/m] | 40.9 |

1.2 Synthesis of the Aqueous Dispersion BM1 Containing the Polymer SCS1

Monomer Mixture (A), Stage i.

80 wt % of items 1 and 2 from table 1.4 are placed in a steel reactor (5 L volume) with reflux condenser and heated to 80° C. The remaining fractions of the components listed under "Initial charge" in table 1.4 are premixed in a separate vessel. This mixture and, separately from it, the initiator solution (table 1.4 items 5 and 6) are introduced dropwise into the reactor simultaneously over the course of 20 minutes, with the fraction of the monomers in the reaction solution, based on the total amount of monomers used in stage i., not exceeding 6.0 wt % throughout the reaction time. 30 minutes of stirring follow.

Monomer Mixture (B), Stage ii.

The components indicated under "Mono 1" in table 1.4 are premixed in a separate vessel. This mixture is introduced dropwise into the reactor over the course of 2 hours, with the fraction of monomers in the reaction solution, based on the total amount of monomers used in stage ii., not exceeding 6.0 wt % throughout the reaction time. 1 hour of stirring follows.

Monomer Mixture (C), Stage iii.

The components indicated under "Mono 2" in table 1.4 are premixed in a separate vessel. This mixture is introduced dropwise into the reactor over the course of 1 hour, with the fraction of monomers in the reaction solution, based on the total amount of monomers used in stage iii., not exceeding 6.0 wt % throughout the reaction time. 2 hours of stirring follows.

The reaction mixture is subsequently cooled to 60° C. and the neutralizing mixture (table 1.4, items 20, 21 and 22) is premixed in a separate vessel. The neutralizing mixture is added to the reactor dropwise over the course of 40 minutes, the pH of the reaction solution being adjusted to a value of 7.5 to 9.5. Subsequently the reaction product is stirred for 30 minutes more, cooled to 25° C., and filtered.

TABLE 1.4

Aqueous dispersion BM1 containing the multistage polymer SCS1

|  |  |  | BM1 |
|---|---|---|---|
|  |  | Initial charge |  |
|  | 1 | DI water | 41.22 |
|  | 2 | EF800 | 0.18 |
|  | 3 | Styrene | 0.47 |
|  | 4 | n-Butyl acrylate | 0.67 |
|  |  | Initiator solution |  |
|  | 5 | DI water | 0.52 |
|  | 6 | APS | 0.02 |
|  |  | Mono 1 |  |
|  | 7 | DI water | 12.61 |
|  | 8 | EF800 | 0.15 |
|  | 9 | APS | 0.02 |
|  | 10 | Styrene | 5.53 |
|  | 11 | n-Butyl acrylate | 13.42 |
|  | 12 | 1,6-HDDA | 0.34 |
|  |  | Mono 2 |  |
|  | 13 | DI water | 5.65 |
|  | 14 | SCS1 | 1.44 |
|  | 15 | APS | 0.02 |
|  | 16 | Methacrylic acid | 0.70 |
|  | 17 | 2-HEA | 0.94 |
|  | 18 | n-Butyl acrylate | 3.69 |
|  | 19 | MMA | 0.57 |
|  |  | Neutralizing |  |
|  | 20 | DI water | 6.39 |
|  | 21 | Butyl glycol | 4.70 |
|  | 22 | DMEA | 0.75 |

The solids content of the aqueous dispersion BM1 was determined for monitoring of reaction. The results, together with the pH and the particle sizes found for the polymer SCS1, are reported in table 1.5.

TABLE 1.5

Characteristics of the aqueous dispersion BM1 and the polymer SCS1

|  | BM1/SCS1 |
|---|---|
| Solids content [%] | 25.6 |
| pH | 8.85 |
| Particle size [nm] | 246 |

2. Synthesis of Further Components for Producing the Base Varnish (SL), the Tinting Base (BF), and the Rheology Module (EZ)

2.1 Synthesis of a Polyurethane Binder Dispersion PD1 a) Preparation of a Polyester Prepolymer PP1

In a 4 l stainless steel reactor equipped with anchor stirrer, thermometer, condenser, thermometer for overhead temperature measurement, and water separator, a polyester resin is prepared from dimerized fatty acid (Pripol® 1012, Croda), isophthalic acid (BP Chemicals), and hexane-1,6-diol (BASF SE). The weight ratio of the starting materials, dimerized fatty acid to isophthalic acid to hexane-1,6-diol, is 54.00:30.02:15.98. Added to this mixture as an entrainer are 2 wt % of cyclohexane.

The mixture is first heated to 100° C. It is slowly heated further until condensation begins. At a maximum overhead temperature of 85° C., heating is then continued in stages up to 220° C. The progress of reaction is monitored via determination of the acid number. When an acid number of ≤3 mg KOH/g is reached, cyclohexane still present is distilled off under reduced pressure. The resultant polymer is diluted in methyl ethyl ketone, to give a solids content of 73%. The polymer obtained had a hydroxyl number of 73 mg KOH/g solids fraction and a (calculated) number-average molecular weight of 1379 g/mol, with an OH functionality of 2.0.

Experimental Data:

$M_n$: 1250 g/mol

Viscosity: 632 mPa·s (measured at 23° C. with a Brookfield CAP 2000+ rotary viscometer, spindle 3, shear rate: 10 000 s$^{-1}$)

b) Preparation of the Polyurethane Binder Dispersion PD1

In a 4 L stainless steel reactor equipped with stirrer, reflux condenser, and thermometer, the polyurethane binder dispersion is synthesized according to a modified acetone process.

For this purpose, 108.9 parts of dimethylolpropionic acid, 587.7 parts of dicyclohexylmethane 4,4'-diisocyanate, 22.6 parts of neopentyl glycol and 1218.7 parts of the prepolymer PP1 are combined. Following addition of methyl ethyl ketone, the mixture (at a solids content of 67±1%) is reacted with stirring at 80-82° C.

The reaction is monitored by titration of the isocyanate content with dibutylamine according to DIN EN ISO 3251. When the isocyanate content is constant and has reached 0.8-1.2%, based on the solution present, a molar excess of 115% of trimethylolpropane is added, based on the amount of free NCO measured.

The synthesis is continued until the NCO content has reached the level of less than 0.3%, based on the solution. The viscosity at this point is 1200-1400 mPa·s (in 1:1 mixture with N-ethyl-2-pyrrolidone, plate/cone, CAP 03, 5000 s$^{-1}$, 23° C.)

The remaining isocyanate is then consumed by reaction with an excess of butanol at 80-82° C. for 3 hours. Then, for neutralization, a mixture of dimethylethanolamine and water is added, resulting in about 65-70% neutralization of the carboxyl functions. After a further 30 minutes, deionized water is added to reach a solids content (without methyl ethyl ketone) of about 28-30%. Additionally, based on the solids content of the target dispersion, 5 wt % of Pluriol® P900 from BASF SE is added as cosolvent. Then, under reduced pressure, the methyl ethyl ketone is distilled off, with the solids content then determined for the polymer being 30-32%. The whitish dispersion obtained in this way has a viscosity of 500-2000 mPa·s (rotary viscometer, Z3, 23° C., 10 s$^{-1}$).

2.2 Synthesis of a Polyurethane Binder Dispersion PD2

In a 4 L stainless steel reactor equipped with stirrer, reflux condenser, and thermometer, the polyurethane binder dispersion PD2 is synthesized according to a modified acetone process.

For this purpose, 91.8 parts of dimethylolpropionic acid, 495.8 parts of dicyclohexylmethane 4,4'-diisocyanate, 19.22 parts of neopentyl glycol and 1028.1 parts of PP1 are combined. Following addition of methyl ethyl ketone, the mixture (at a solids content of 67±1%) is reacted with stirring at 80-82° C.

The reaction is monitored by titration of the isocyanate content with dibutylamine according to DIN EN ISO 3251. When the isocyanate content is constant and has reached 1.0-1.2%, based on the solution present, a molar excess of 130% of trimethylolpropane is added, based on the amount of free NCO measured. Polymerization is then continued, with ongoing measurement of the viscosity, until the viscosity has reached 680-750 mPas (in 1:1 mixture with N-ethyl-2-pyrrolidone, plate/cone, CAP 03, 5000 s 23° C.). When the target window is reached, 100 parts of butyl glycol are added. For neutralization, a mixture of dimethylethanolamine and butyl glycol is added, so that about 65-70% of the carboxyl functionalities are neutralized and the resulting solids content is 44±1% following removal of the ketone by distillation. This gives a clear yellowish solution having a viscosity of 1400-1850 mPa·s when measured at a solids content of 35% in butyl glycol.

2.3 Acrylate Binder Dispersion AD1

The acrylate binder dispersion AD1 is an acrylate modified with polyether groups and having a solids fraction of 42.5±1% in water/butyl glycol (1:1); the molecular weight of the polyether used for the modification is 2000 g/mol.

The acrylate binder dispersion AD1 has a viscosity of 900-100 mPa·s (CAP2000, 23° C., Cone3, 5000/s). The molecular weight was found to be $M_n$ 5000-8000 g/mol and $M_w$ of 15 000-30 000 g/mol.

3. Examples of Mixer Systems for Producing Aqueous Refinish Compositions 3.1 Preparation of Na Mg Phyllosilicate Dispersions a) Preparation of a 1.5% Na Mg Phyllosilicate Dispersion 1.5 wt % of a commercial sodium magnesium phyllosilicate (preferably Laponite RD, available from BYK-Chemie GmbH) are dispersed in deionized water in the presence of 1.0 wt % of Pluriol® 900 (available from BASF SE) to form a mixture.

b) Preparation of a 3% Na Mg Phyllosilicate Dispersion 3.0 wt % of a commercial sodium magnesium phyllosilicate (preferably Laponite RD, available from BYK-Chemie GmbH) are dispersed in deionized water in the presence of 3.0 wt % of Pluriol® 900 (available from BASF SE) to form a mixture.

3.2 Production of Different Base Varnishes SL1 to SL7

The components listed in table 3.1 are brought together in the order stated, with stirring, to form an aqueous mixture. This mixture is subsequently stirred intensely for a further 10 minutes.

TABLE 3.1

Production of base varnishes SL1 to SL7

|  | SL1 | SL2 | SL3 | SL4 | SL5 | SL6 | SL7 |
| --- | --- | --- | --- | --- | --- | --- | --- |
| 1.5% Na Mg phyllosilicate dispersion | 10.60 | 45.60 | 45.60 | 45.60 | 45.60 | 45.60 | 45.60 |
| Binder dispersion prepared as per patent application | 52.70 | | | | | | |

TABLE 3.1-continued

Production of base varnishes SL1 to SL7

| | SL1 | SL2 | SL3 | SL4 | SL5 | SL6 | SL7 |
|---|---|---|---|---|---|---|---|
| EP 022 8003 B2, page 8, lines 6 to 18 | | | | | | | |
| Polyurethane binder dispersion PD2 | | 22.00 | 22.00 | 22.00 | 22.00 | 22.00 | 22.00 |
| Aqueous dispersion BM1 | | 25.00 | 25.00 | 25.00 | 25.00 | 25.00 | 25.00 |
| Acrysol ™ RM-8 | 0.25 | | | | | | |
| Acticide B20 | 0.20 | | | | | | |
| Butyl glycol | | 3.40 | | | | | |
| n-Pentanol | | | 3.40 | | | | |
| n-Hexanol | | | | 3.40 | | | |
| n-Propanol | | | | | 3.40 | | |
| n-Butanol | | | | | | 3.40 | |
| n-Octanol | | | | | | | 3.40 |
| Aquacer ® 840 | | 2.50 | 2.50 | 2.50 | 2.50 | 2.50 | 2.50 |
| Rheovis ® AS 1130 | | 0.50 | 0.50 | 0.50 | 0.50 | 0.50 | 0.50 |
| Deionized water | 36.25 | 1.00 | 1.00 | 1.00 | 1.00 | 1.00 | 1.00 |
| Total: | 100.00 | 100.00 | 100.00 | 100.00 | 100.00 | 100.00 | 100.00 |

3.3 Production of Different Tinting Bases BF1 and BF2

The components listed in table 3.2 are stirred together in the order stated to form a mixture. This mixture is then stirred for 10 minutes.

TABLE 3.2

Production of tinting bases BF1 and BF2

| | BF1 | BF2 |
|---|---|---|
| Polyurethane binder dispersion PD2 | 51.75 | |
| Polyurethane binder dispersion PD1 | | 52.00 |
| 2,4,7,9-Tetramethyl-5-decynediol, 52% in BG (available from BASF SE) | 6.60 | |
| 2-Butanol | 14.33 | |
| 3% Na Mg phyllosilicate dispersion | | 10.00 |
| Aerosil ® R 972 | 2.03 | |
| Aerodisp ® WR 8520 | | 5.00 |
| Raybo 61 AquaWet | 0.30 | |
| Acrylate binder dispersion AD1 | | 5.00 |
| Deionized water | | 6.00 |
| Commercial aluminum pigment (Alu Stapa Hydrolux 2156, available from Altana-Eckart) | 25.00 | 22.00 |
| Total: | 100.00 | 100.00 |

3.4 Production of Different Rheology Modules EZ1 to EZ7

The components listed in table 3.3 are brought together in the order stated, with stirring, to give an aqueous mixture. This mixture is then stirred intensely for a further 10 minutes.

TABLE 3.3

Production of rheology modules EZ1 to EZ7

| | EZ1 | EZ2 | EZ3 | EZ4 | EZ5 | EZ6 | EZ7 |
|---|---|---|---|---|---|---|---|
| Laponite ® RD | 1.50 | 1.09 | 1.09 | 1.09 | 1.09 | 1.09 | 1.09 |
| Pluriol ® P900 | 1.00 | 0.73 | 0.73 | 0.73 | 0.73 | 0.73 | 0.73 |
| Parmetol DF 35 | 0.18 | 0.13 | 0.13 | 0.13 | 0.13 | 0.13 | 0.13 |
| Deionized water | 97.32 | 70.85 | 70.85 | 70.85 | 70.85 | 70.85 | 70.85 |
| Aqueous dispersion BM1 | | 12.50 | 12.50 | 12.50 | 12.50 | 12.50 | 12.50 |
| Polyurethane binder dispersion PD1 | | 11.00 | 11.00 | 11.00 | 11.00 | 11.00 | 11.00 |
| Butyl glycol | | 1.70 | | | | | |
| n-Pentanol | | | 1.70 | | | | |
| n-Hexanol | | | | 1.70 | | | |
| n-Propanol | | | | | 1.70 | | |
| n-Butanol | | | | | | 1.70 | |
| n-Octanol | | | | | | | 1.70 |
| Aquacer ® 840 | | 1.25 | 1.25 | 1.25 | 1.25 | 1.25 | 1.25 |
| Rheovis ® AS 1130 | | 0.25 | 0.25 | 0.25 | 0.25 | 0.25 | 0.25 |
| Deionized water | | 0.50 | 0.50 | 0.50 | 0.50 | 0.50 | 0.50 |
| Total: | 100.00 | 100.00 | 100.00 | 100.00 | 100.00 | 100.00 | 100.00 |

4. Production of Noninventive Aqueous Coating Compositions WBM1 and WBM2, of Inventive Aqueous Coating Compositions WBM3 to WBM5, and of Noninventive Aqueous Coating Compositions WBM6 to WBM8, in Each Case as Mixer System, Based on Components SL1 to SL7, BF1 and BF2, and EZ1 to EZ7

The respective coating compositions (WBM1 to WBM8) were produced by mixing the components listed in table 4.1, in the order stated. Following addition of the respective tinting base to the respective base varnish, and after addition of the respective standardizing additive to the previous mixture, the resulting mixture was stirred. The respective viscosities arise from the compositions and are not adjusted further. In the case of WBM1, the viscosity/flow time is 20-25 seconds, while for all other coating materials it is 25-35 seconds, as measured in a DIN 4 cup.

TABLE 4.1

Production of aqueous coating compositions WBM1 and WBM2 (not inventive), WBM3 to WBM5 (inventive), and WBM6 to WBM8 (not inventive)

|  | WBM1 | WBM2 | WBM3 | WBM4 | WBM5 | WBM6 | WBM7 | WBM8 |
|---|---|---|---|---|---|---|---|---|
| Base varnish | | | | | | | | |
| SL1 | 72.00 | | | | | | | |
| SL2 | | 60.00 | | | | | | |
| SL3 | | | 60.00 | 65.00 | | | | |
| SL4 | | | | | 60.00 | | | |
| SL5 | | | | | | 60.00 | | |
| SL6 | | | | | | | 60.00 | |
| SL7 | | | | | | | | 60.00 |
| Tinting base | | | | | | | | |
| BF1 | 28.00 | | | | | | | |
| BF2 | | 40.00 | 40.00 | 35.00 | 40.00 | 40.00 | 40.00 | 40.00 |
| Rheology module | | | | | | | | |
| EZ1 | 50.00 | | | | | | | |
| EZ2 | | 50.00 | | | | | | |
| EZ3 | | | 50.00 | 50.00 | | | | |
| EZ4 | | | | | 50.00 | | | |
| EZ5 | | | | | | 50.00 | | |
| EZ6 | | | | | | | 50.00 | |
| EZ7 | | | | | | | | 50.00 |
| Total: | 150.00 | 150.00 | 150.00 | 150.00 | 150.00 | 150.00 | 150.00 | 150.00 |

5.1 Comparison Between Aqueous Coating Compositions WBM1 and WBM4 in Terms of Resistance to Moisture, Adhesion Properties in the Stonechip and Steam Jet Tests, and Angle-Dependent Lightnesses The condensation sensitivity, the stonechip adhesion and steam jet adhesion, and the hue were assessed for the aqueous coating compositions WBM1 and WBM4 in accordance with methods described above. The results are summarized in tables 5.1 to 5.4.

TABLE 5.1

Effect of condensation on adhesion, swelling and blistering of the multicoat systems

| | after 1 hour | | | after 24 hours | | |
|---|---|---|---|---|---|---|
| | Blistering | Swelling | Crosscut | Blistering | Swelling | Crosscut |
| WBM1, coated by method A | m0/g0 | bOK | GT0 | m0/g0 | OK | GT0 |
| WBM4, coated by method B | m0/g0 | bOK | GT0 | m0/g0 | OK | GT0 |

TABLE 5.2

Results of the investigations of stonechip and steam jet adhesion

| | Stonechip | Steam jet |
|---|---|---|
| WBM1, coated by method A | KW2 | <1 mm |
| WBM4, coated by method B | KW2 | <1 mm |

The results demonstrate that the inventive aqueous coating composition WBM4, based on the aqueous dispersion BM1 containing the polymer SCS1 in combination with n-pentanol, has no disadvantages in condensation exposure relative to the noninventive coating composition WBM1; in the stonechip and steam jet tests as well, identical results are found.

TABLE 5.3

Results of the investigations of hue (angle-dependent lightness or flop index)

| | Coating method A | | Coating method B | |
|---|---|---|---|---|
| | WBM1 | WBM4 | WBM1 | WBM4 |
| $L^*_{15°}$ | 146.8 | 149.0 | 144.7 | 147.3 |
| $L^*_{25°}$ | 111.7 | 110.8 | 110.1 | 109.6 |
| $L^*_{45°}$ | 56.8 | 53.9 | 57.2 | 53.9 |
| $L^*_{75°}$ | 32.6 | 31.5 | 33.8 | 31.8 |
| Flop index | 342.6 | 351.7 | 325.7 | 344.7 |

TABLE 5.4

Differences in flop between coating methods A and B

| | WBM1 | WBM4 |
|---|---|---|
| Flop (method A) − flop (method B) | 16.9 | 7.1 |

Both when coated with intermediate flash-off (method A) and when coated wet-on-wet (method B), the inventive coating composition WBM4 exhibits better aluminum pigment orientation and hence better flop than the comparative material WBM1. For WBM4, furthermore, a significantly smaller difference is found between the two coating methods, and hence a better consistency of hue under different coating parameters.

5.2 Comparison Between Aqueous Coating Compositions WBM2 and WBM3 in Terms of Angle-Dependent Lightnesses (Flop)

The aqueous coating compositions WBM2 (noninventive) and WBM3 (inventive) were investigated in respect of hue (angle-dependent lightnesses or flop) by methods described above. The results are summarized in table 5.6.

TABLE 5.6

Results of the investigations of hue (angle-dependent lightness or flop index)

| | WBM2 | WBM3 |
|---|---|---|
| Flop (method A) | 299 | 355 |
| Flop (method B) | 289 | 360 |
| Flop (method A) − flop (method B) | 10 | −5 |

The results demonstrate that it is not just the use of the aqueous dispersion BM1 containing the polymer SCS1 that leads to outstanding orientation of the effect pigments and hence to good flop, but also that the choice of the organic cosolvent is important. Where n-pentanol is substituted by butyl glycol (WBM2), independently of the coating method, a significantly poorer flop and also a greater dependency of the flop on the coating parameters are found.

5.3 Comparison Between the Inventive Aqueous Coating Compositions WBM3 and WBM5 and the Noninventive Aqueous Coating Compositions WBM6 to WBM8 in Terms of Hue (Flop Index)

The investigations on the aqueous coating compositions WBM3 and WBM5 (inventive, comprising the aqueous dispersion BM1 comprising the polymer SCS1) in combination with n-pentanol and n-hexanol, respectively) and also WBM6 to WBM8 (noninventive, comprising alcohols not for inventive use) took place in accordance with the methods described above. Tables 5.7 to 5.9 summarize the results.

TABLE 5.7

Results of the investigations of hue (angle-dependent lightness or flop index)

| | WBM3 | WBM5 | WBM6 | WBM7 | WBM8 |
|---|---|---|---|---|---|
| Flop (method A) | 355 | 364 | 310 | 326 | 343 |
| Flop (method B) | 360 | 355 | 292 | 312 | 305 |
| Flop (method A) − flop (method B) | −5 | 9 | 18 | 14 | 38 |

The inventive aqueous coating compositions WBM3 and WBM5, independently of the coating method, exhibit the best flop values and, moreover, exhibit the smallest difference in hue with different coating parameters. In contrast, the use both of shorter-chain and longer-chain monoalcohols leads to a deterioration in the hue values and to a greater sensitivity of hue in relation to the coating methods employed.

All refinish coating compositions of the invention have a VOC content of less than 250 g/l.

What is claimed is:

1. A mixer system for producing aqueous refinish compositions, the mixer system comprising:
   at least one component (1) as pigment-free base varnish, comprising at least one physically curing polyurethane or a self-crosslinking polyurethane or an externally crosslinking polyurethane;
   at least one component (2) as tinting base, comprising at least one physically drying polyurethane or a self-crosslinking polyurethane or an externally crosslinking polyurethane and at least one color-imparting and/or optical-effect-imparting pigment; and
   at least one component (3) as rheology module, comprising at least one inorganic and/or organic thickener,
   wherein at least one of the components, (1), (2), or (3), comprises an aqueous dispersion comprising at least one seed core shell polymer, and wherein at least one of the components, (1), (2), or (3), comprises at least one aliphatic monoalcohol having 5 carbon atoms and/or at least one aliphatic monoalcohol having 6 carbon atoms, the aqueous dispersion being prepared by the successive radical emulsion polymerization of three mutually different monomer mixtures (A), (B), and (C) of olefinically unsaturated monomers, wherein optionally at least one of the monomer mixtures, (A), (B) or (C), comprises at least one polyurethane (P) containing at least one olefinically unsaturated group, and wherein, the optional polyurethane (P), if present, is admixed to at least one of the monomer mixtures (A), (B) or (C), the monomer mixture (A) comprises at least 50 wt % of monomers having a solubility in water of less than 0.5 g/l at 25° C., and a polymer (a) that is prepared from the mixture (A) possesses a glass transition temperature of 10 to 65° C., the monomer mixture (B) comprises at least one polyunsaturated monomer, and a polymer (b) that is prepared from the mixture (B) possesses a glass transition temperature of −35 to 15° C., and a polymer (c) that is prepared from the monomer mixture (C) possesses a glass transition temperature of −50 to 15° C., and wherein
i. first the monomer mixture (A) is polymerized,
ii. then the monomer mixture (B) is polymerized in the presence of the polymer prepared under i., and
iii. thereafter the monomer mixture (C) is polymerized in the presence of the polymer prepared under ii.

2. The mixer system as claimed in claim 1, wherein at least one of the components, (1), (2), or (3), comprises both the aqueous dispersion comprising at least one seed core shell polymer and the aliphatic monoalcohol having 5 carbon atoms and/or at least one aliphatic monoalcohol having 6 carbon atoms.

3. The mixer system as claimed in claim 1, wherein at least one of the monomer mixtures, (A), (B), or (C), comprises at least one polyurethane (P).

4. The mixer system as claimed in claim 1, wherein the at least one aliphatic monoalcohol having 5 carbon atoms is n-pentanoland the at least one aliphatic monoalcohol having 6 carbon atoms is n-hexanol.

5. The mixer system as claimed in claim 1, wherein the weight-percentage fraction of the sum of all aliphatic monoalcohols having 5 carbon atoms and 6 carbon atoms in the respective component (1), (2), or (3) is less than 5 wt %, based on the respective component (1), (2), or (3), and at least one of the components, (1), (2), or (3), has a weight-percentage fraction of the sum of all aliphatic monoalcohols having 5 carbon atoms and 6 carbon atoms of at least 1.0 wt %, based on the total weight of the respective component (1), (2), or (3).

6. The mixer system as claimed in claim 1, wherein the fraction of the monomer mixture (A) is from 0.1 to 10 wt %, the fraction of the monomer mixture (B) is from 60 to 80 wt %, and the fraction of the monomer mixture (C) is from 10 to 30 wt %, based in each case on the sum of the individual amounts of the mixtures (A), (B), and (C).

7. The mixer system as claimed in claim 1, wherein the monomer mixture (A) comprises at least one monounsaturated ester of (meth)acrylic acid with an alkyl radical, and at least one vinyl group-containing, monoolefinically unsaturated monomer with a radical arranged on the vinyl group that is aromatic or that is mixed saturated aliphatic-aromatic, wherein the aliphatic fractions of the radical are alkyl groups.

8. The mixer system as claimed in claim 1, wherein the monomer mixture (B) further comprises at least one monounsaturated ester of (meth)acrylic acid with an alkyl radical, and at least one vinyl group-containing, monoolefinically unsaturated monomer with a radical arranged on the vinyl group that is aromatic or that is mixed saturated aliphatic-aromatic, wherein the aliphatic fractions of the radical are alkyl groups.

9. The mixer system as claimed in claim 1, wherein the monomer mixture (C) comprises at least one alpha-beta-unsaturated carboxylic acid, at least one monounsaturated ester of (meth)acrylic acid with an alkyl radical substituted by a hydroxyl group, and at least one monounsaturated ester of (meth)acrylic acid with an alkyl radical.

10. An aqueous refinish composition produced by mixing components (1), (2), and (3) of the mixer system as claimed in claim 1, with the further admixing of a crosslinker if component (1) and/or (2) comprises an externally crosslinking polyurethane.

11. The aqueous refinish composition as claimed in claim 10, wherein the weight-percentage fraction of the at least one seed core shell polymer in the aqueous dispersion, based on the total weight of the aqueous refinish composition, is 1.0 to 24.0 wt %.

12. The aqueous refinish composition as claimed in claim 10, wherein the weight-percentage fraction of the sum of all aliphatic monoalcohols having 5 carbon atoms and 6 carbon atoms, based on the total weight of the refinish composition, is from 0.2 to 3.0 wt %.

13. The aqueous refinish composition as claimed in claim 10, wherein the aqueous refinish composition has a VOC content of less than 250 g/l.

14. A method for producing refinish compositions, the method comprising:
using the mixer system as claimed in claim 1 to produce the refinish compositions for automotive refinishing.

* * * * *